(12) United States Patent
Bao et al.

(10) Patent No.: US 11,595,931 B2
(45) Date of Patent: Feb. 28, 2023

(54) APPARATUS AND METHODS FOR TARGET USER EQUIPMENT RECOMMENDATION FOR SIDELINK-ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/367,112

(22) Filed: Jul. 2, 2021

(65) Prior Publication Data
US 2022/0015057 A1 Jan. 13, 2022

Related U.S. Application Data

(60) Provisional application No. 63/049,038, filed on Jul. 7, 2020.

(51) Int. Cl.
*H04W 64/00* (2009.01)
*H04L 5/00* (2006.01)

(52) U.S. Cl.
CPC ........... *H04W 64/00* (2013.01); *H04L 5/0048* (2013.01)

(58) Field of Classification Search
CPC ...... H04W 64/00; H04W 76/14; H04L 5/0048
See application file for complete search history.

(56) References Cited

U.S. PATENT DOCUMENTS

| 2019/0239181 A1 | 8/2019 | Gangakhedkar et al. |
| 2021/0160712 A1* | 5/2021 | Tadayon ............... H04W 36/16 |

FOREIGN PATENT DOCUMENTS

| WO | WO-2020146739 A1 | 7/2020 |
| WO | WO-2021104403 A1 | 6/2021 |

OTHER PUBLICATIONS

International Search Report and Written Opinion—PCT/US2021/040530—ISA/EPO—dated Oct. 8, 2021.

(Continued)

*Primary Examiner* — Kabir A Timory
(74) *Attorney, Agent, or Firm* — Procopio, Cory, Hargreaves & Savitch LLP

(57) ABSTRACT

A target user equipment (UE) identifies other UEs that are available for a positioning reference signal (PRS) exchange for sidelink assisted positioning of the target UE. The target UE may provide to a network entity, such as a location server, the identifications of the UEs that are available for the sidelink-assisted positioning of the target UE. The network, entity may generate and provide for sidelink-assisted positioning the PRS configurations for UEs, which may include the one or more UEs recommended by the target UE. The target UE may provide a list of UEs, in response to a request from the network entity, in response to receipt of a network generated list provided to the target UE, or in response to a determination that PRS measurements based on previously acquired UE PRS configurations are inadequate. The sidelink-assisted positioning may be used when the target UE is present in a null-zone.

26 Claims, 15 Drawing Sheets

(56) References Cited

OTHER PUBLICATIONS

Qualcomm Incorporated (Moderator): "Email Summary on NR Positioning", 3GPP Draft, RP-192412, 3GPP TSG-RAN Meeting #86, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019 (Dec. 2, 2019), XP051834111, 87 Pages, Retrieved from the Internet: URL:https://ftp.3gpp.org/tsg_ran/TSG_RAN/TSGR_86/Docs/RP-192412.zip, RP-192412 Email summary on NR positioning.docx [retrieved on Dec. 2, 2019] the whole document.

* cited by examiner

APPARATUS AND METHODS FOR TARGET USER EQUIPMENT RECOMMENDATION FOR SIDELINK-ASSISTED POSITIONING

CLAIM OF PRIORITY UNDER 35 U.S.C. § 119

This application claims under 35 USC § 119 the benefit of and priority to U.S. Provisional Application No. 63/049,038, filed Jul. 7, 2020, and entitled "TARGET USER EQUIPMENT RECOMMENDATION FOR SIDELINK-ASSISTED POSITIONING," which is assigned to the assignee hereof and is incorporated herein by reference in its entirety.

BACKGROUND

Field of the Disclosure

The present disclosure relates generally to communication, and more specifically to techniques for supporting location services for user equipments (UEs) served by a Fifth Generation (5G) wireless network.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax), fifth-generation (5G), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

A target user equipment (UE) identifies other UEs that are available for a positioning reference signal (PRS) exchange for sidelink-assisted positioning of the target UE. The target UE may provide to a network entity, such as a location server, the identifications of the UEs that are available for the sidelink-assisted positioning of the target UE. The network entity may generate and provide for sidelink-assisted positioning the PRS configurations for UEs, which may include the one or more UEs recommended by the target UE. The target UE may provide a list of UEs, for example, in response to a request from the network entity, in response to receipt of a network generated list provided to the target UE, or in response to a determination that PRS measurements based on previously acquired UE PRS configurations are inadequate. The sidelink-assisted positioning may be used when the target UE is present in a null-zone.

In one implementation, a method of initiating positioning reference signal exchange performed by a first user equipment (UE), includes identifying one or more UEs available for a positioning reference signal exchange with the first UE for sidelink-assisted positioning of the first UE; and providing to a network entity identifications of the one or more UEs available for the sidelink-assisted positioning of the first UE.

In one implementation, a first user equipment (UE) configured for initiating positioning reference signal exchange, includes a transceiver; a memory; and a processor, communicatively coupled to the transceiver and the memory, and configured to: identify one or more UEs available for a positioning reference signal exchange with the first UE for sidelink-assisted positioning of the first UE; and provide to a network entity identifications of the one or more UEs available for the sidelink-assisted positioning of the first UE.

In one implementation, a first user equipment (UE) configured for initiating positioning reference signal exchange, includes means for identifying one or more UEs available for a positioning reference signal exchange with the first UE for sidelink-assisted positioning of the first UE; and means for providing to a network entity identifications of the one or more UEs available for the sidelink-assisted positioning of the first UE.

In one implementation, a non-transitory storage medium including program code stored thereon, the program code is operable to configure a processor of a first user equipment (UE) to initiate positioning reference signal exchange, includes program code to identify one or more UEs available for a positioning reference signal exchange with the first UE for sidelink-assisted positioning of the first UE; and program code to provide to a network entity identifications of the one or more UEs available for the sidelink-assisted positioning of the first UE.

In one implementation, a method of initiating positioning reference signal exchange for a first user equipment (UE) performed by a network entity, includes receiving from the first UE an identification of one or more UEs available for a positioning reference signal exchange with the first UE for sidelink-assisted positioning of the first UE; generating a positioning reference signal configuration for at least one UE in response to the identification of one or more UEs available for a positioning reference signal exchange with the first UE for the sidelink-assisted positioning of the first UE; and sending to the UE the positioning reference signal configuration for at least one UE.

In one implementation, a network entity configured to initiate positioning reference signal exchange for a first user equipment (UE), includes a transceiver; a memory; and a processor, communicatively coupled to the transceiver and the memory, and configured to: receive from the first UE an identification of one or more UEs available for a positioning reference signal exchange with the first UE for sidelink-assisted positioning of the first UE; generate a positioning reference signal configuration for at least one UE in response to the identification of one or more UEs available for a positioning reference signal exchange with the first UE for the sidelink-assisted positioning of the first UE; and send to the UE the positioning reference signal configuration for at least one UE.

In one implementation, a network entity configured to initiate positioning reference signal exchange for a first user equipment (UE), includes means for receiving from the first UE an identification of one or more UEs available for a positioning reference signal exchange with the first UE for sidelink-assisted positioning of the first UE; means for generating a positioning reference signal configuration for at least one UE in response to the identification of one or more UEs available for a positioning reference signal exchange with the first UE for the sidelink-assisted positioning of the first UE; and means for sending to the UE the positioning reference signal configuration for at least one UE.

In one implementation, a non-transitory storage medium including program code stored thereon, the program code is operable to configure a processor of a network entity configured to initiate positioning reference signal exchange for a first user equipment (UE), includes program code to receive from the first UE an identification of one or more UEs available for a positioning reference signal exchange with the first UE for sidelink-assisted positioning of the first UE; program code to generate a positioning reference signal configuration for at least one UE in response to the identification of one or more UEs available for a positioning reference signal exchange with the first UE for the sidelink-assisted positioning of the first UE; and program code to send to the UE the positioning reference signal configuration for at least one UE.

BRIEF DESCRIPTION OF THE DRAWINGS

The accompanying drawings are presented to aid in the description of various aspects of the disclosure and are provided solely for illustration of the aspects and not limitation thereof.

Figure 1:
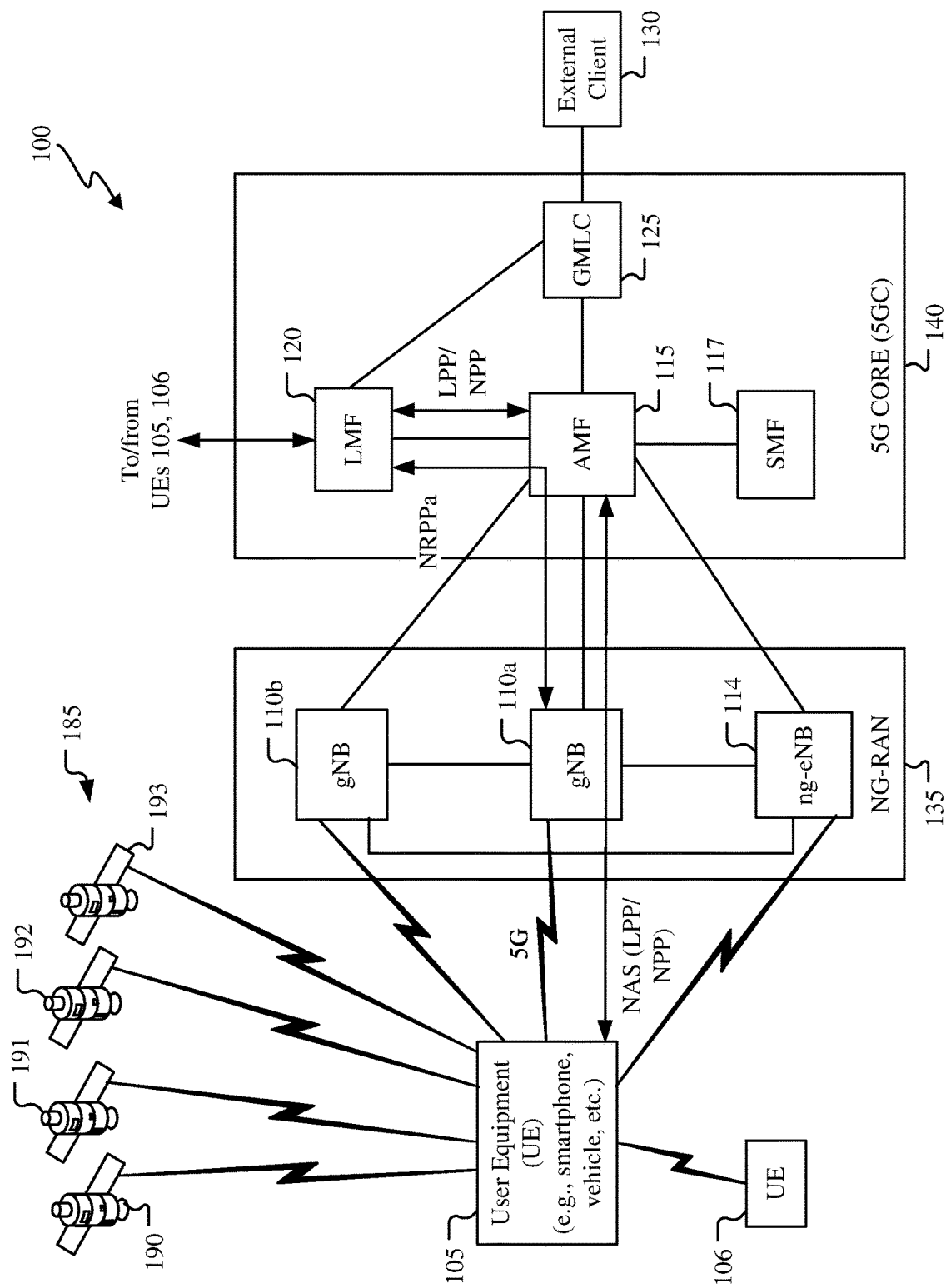
FIG. 1 is a simplified diagram of an example wireless communications system.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110*a* and 110*b* of a base station are shown in FIG. 1. A reference to a base station 110 then refers to any of base stations 110*a* or 110*b*.

DETAILED DESCRIPTION

Techniques are discussed herein for determining location of a target user equipment (UE) based on exchanging one or more positioning reference signals (PRS) between the target UE and one or more anchor UEs, which for example, may be in response to determining that the target UE is or will be in a null zone. The UE-UE PRS exchange may be triggered by the target UE or by another entity such as a location server. For example, a target UE or a location management function (e.g., in a server or base station) may determine that the target UE is, or will be in the future, in a null zone where insufficient base station positioning reference signals are available to achieve desired positioning accuracy (e.g., positioning uncertainty below a desired threshold). In response to this determination, one or more UEs may be identified as anchor UEs to serve as reference points and to exchange one or more positioning reference signals with the target UE to provide (or supplement) positioning measurements for determining the location of the target UE. To be identified (selected) as an anchor UE, a UE may need to have a location uncertainty below a threshold uncertainty and/or have a likelihood of line of sight with the target UE above a threshold likelihood. In implementations, the target UE may provide a recommendation to a network entity that includes the identities of one or more other UEs available for positioning reference exchange with the target UE for sidelink-assisted positioning of the target UE. These are examples, and other examples may be implemented.

Items and/or techniques described herein may provide one or more of the following capabilities, as well as other capabilities not mentioned. Accuracy of an estimated location of a UE may be improved. An estimated location of a UE may be determined despite the UE being disposed in a null zone where insufficient base station positioning reference signals are received by the UE to determine the location of the UE with a desired accuracy. Positioning reference signal overhead may be offloaded from a location management function and/or base station to UE-to-UE communications, e.g., in a sidelink channel Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1 illustrates an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140, which may be referred to as a 5G core, an NG Core network (NGC), or core network. Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the communication system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to collectively as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs ( ) 110a, 110b are examples and may, in various embodiments, be replaced by or include various other location server functionality and/or base station functionality respectively.

The communication system 100 is capable of wireless communication in that components of the communication system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the communication system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The communication system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The communication system 100 may include only macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
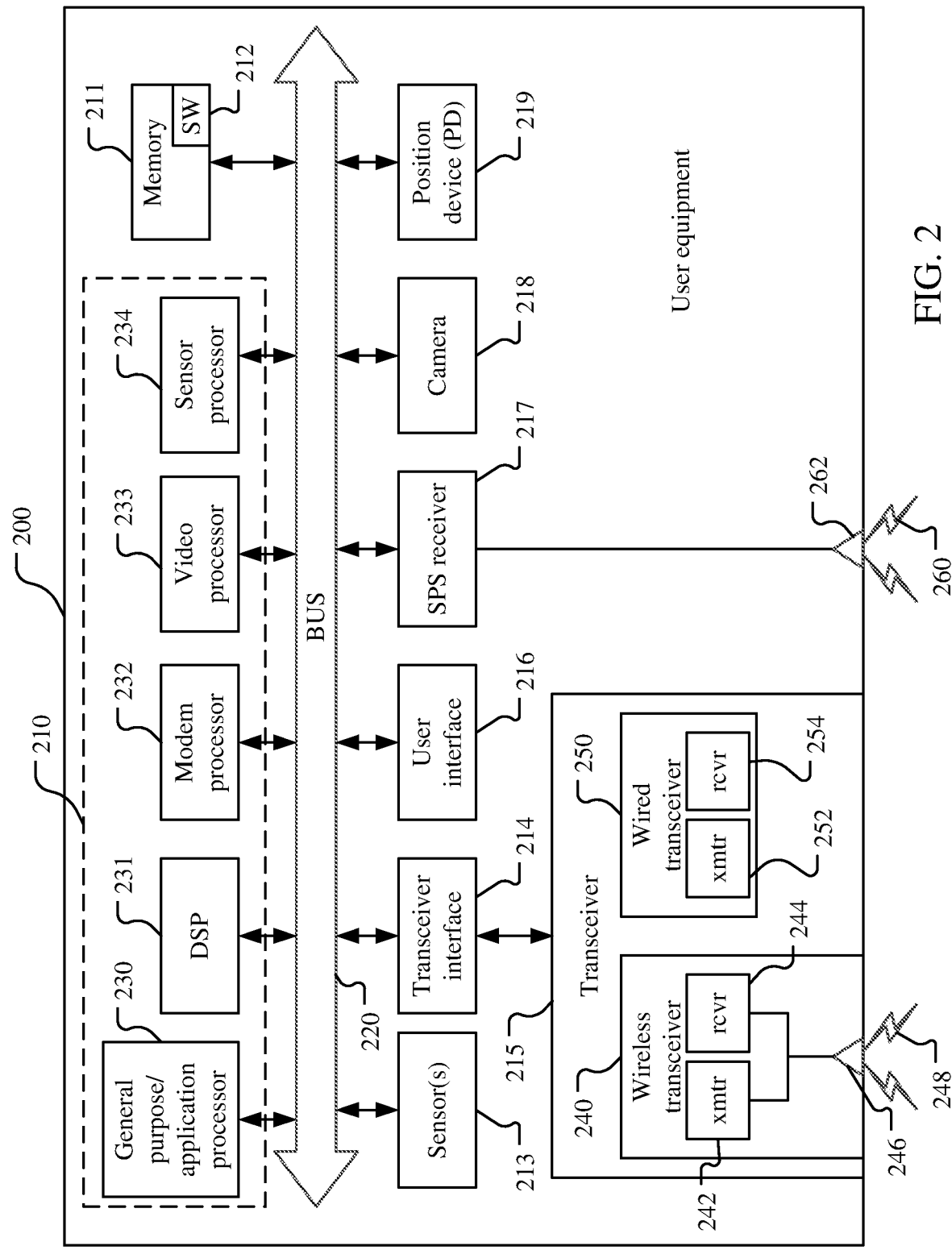
FIG. 2 is a block diagram of components of an example user equipment shown in FIG. 1.

FIG. 2 illustrates a UE 200, which is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position engine (PE) 219. The processor 210, the memory 211, the sensor(s) 213, the transceiver interface 214, the user interface 216, the SPS receiver 217, the camera 218, and the position engine 219 may be communicatively coupled to each other by a bus 220 (which may be configured, e.g., for optical and/or electrical communication). One or more of the shown apparatus (e.g., the camera 218, the position engine 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including an application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to operate as a special purpose computer programmed to perform the various functions described herein. Alternatively, the software 212 may not be directly executable by the processor 210 but may be configured to cause the processor 210, e.g., when compiled and executed, to operate as a special purpose computer to perform the various functions described herein. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below, including the description in FIG. 5.

The configuration of the UE 200 shown in FIG. 2 is an example and not limiting of the present disclosure or the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the position engine 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes. The sensor(s) 213 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position engine (PE) 219 is illustrated as separate from processor 210, but may be part of the processor 210. The position engine (PE) 219 may be configured to determine a position of the UE 200, motion of the UE 200, and/or relative position of the UE 200, and/or time. For example, the position engine 219 may communicate with, and/or include some or all of, the SPS receiver 217. The position engine 219 may work in conjunction with the processor 210 and the memory 211 as appropriate to perform at least a portion of one or more positioning methods, although the description herein may refer only to the position engine 219 being configured to perform, or performing, in accordance with the positioning method(s). The position engine 219 may also or alternatively be configured to determine location of the UE 200 using terrestrial-based signals (e.g., at least some of the wireless signals 248) for trilateration, for assistance with obtaining and using the SPS signals 260, or both. The position engine 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The position engine 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The position engine 219 may be configured to provide indications of uncertainty and/or error in the determined position and/or motion.

Figure 3:
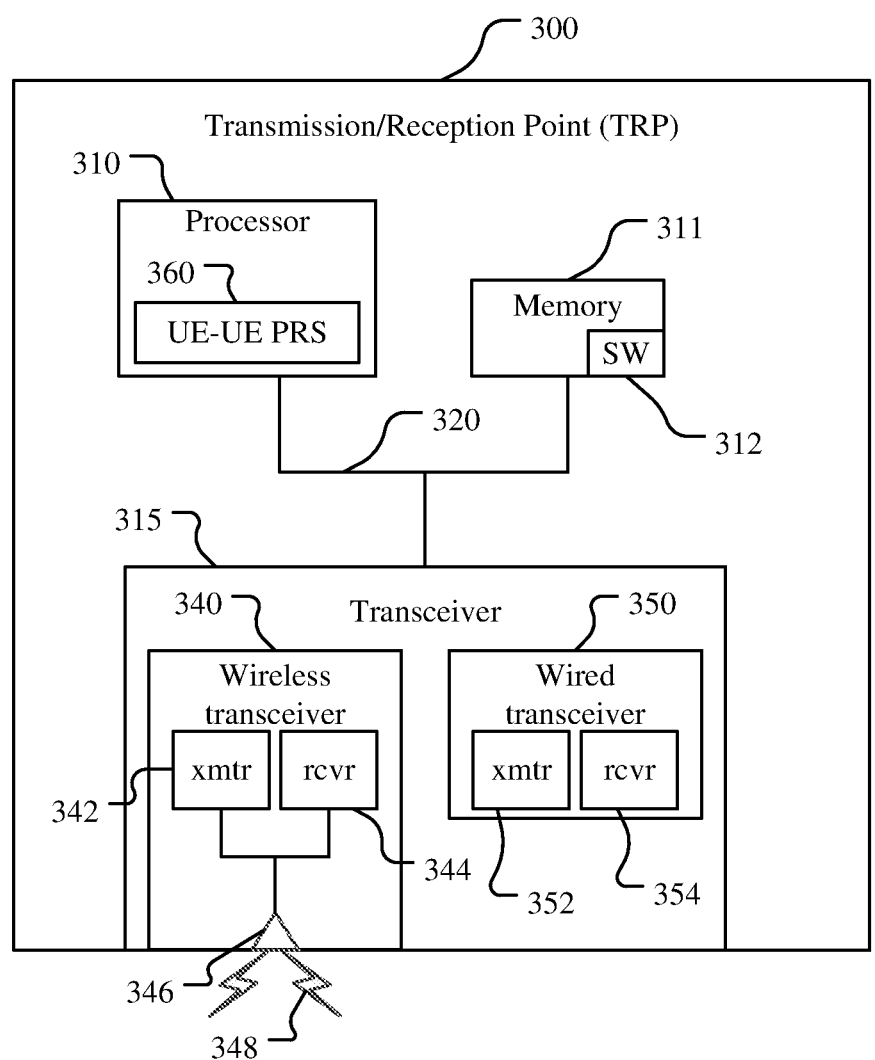
FIG. 3 is a block diagram of components of an example transmission/reception point shown in FIG. 1.

FIG. 3 illustrates an example of a TRP 300, which may be one of the BSs 110a, 110b, 114 and comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including an application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to operate as a special purpose computer programmed to perform the various functions described herein. Alternatively, the software 312 may not be directly executable by the processor 310 but may be configured to cause the processor 310, e.g., when compiled and executed, to operate as a special purpose computer to perform the various functions described herein. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 135 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the present disclosure or the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
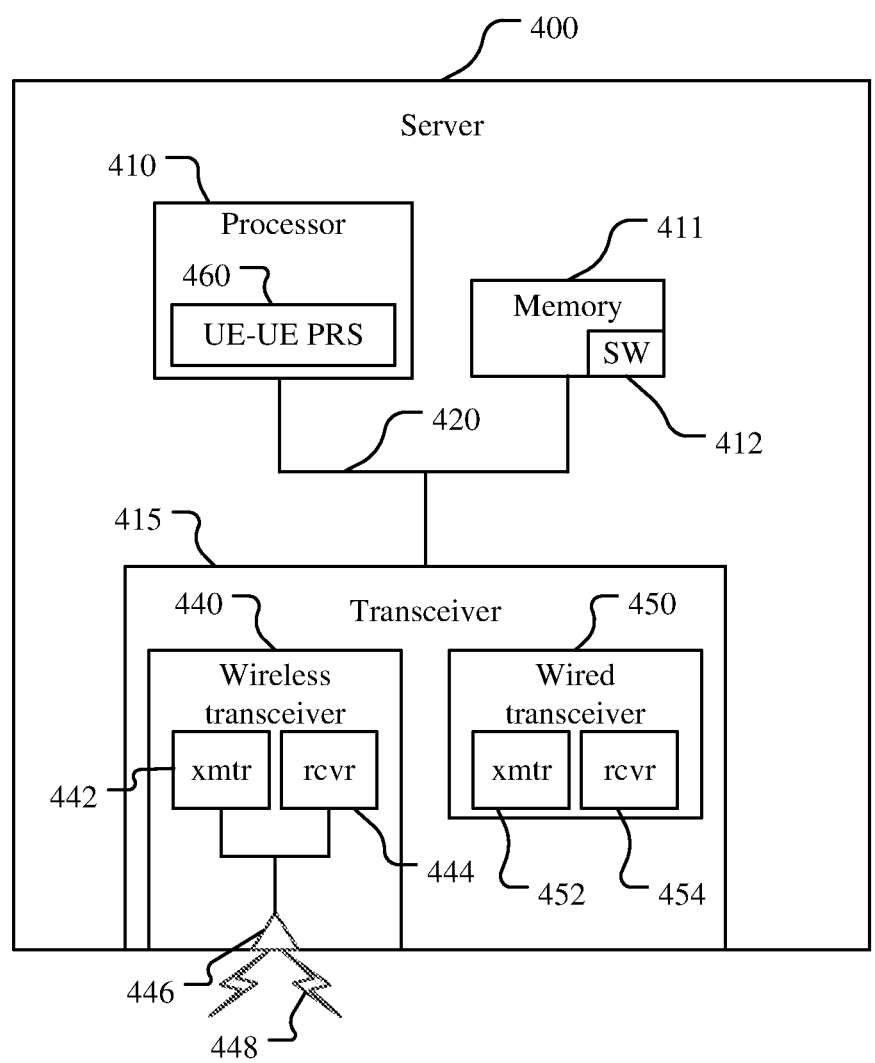
FIG. 4 is a block diagram of components of an example server shown in FIG. 1.

FIG. 4 illustrates an example of a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including an application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to operate as a special purpose computer programmed to perform the various functions described herein. Alternatively, the software 412 may not be directly executable by the processor 410 but may be configured to cause the processor 410, e.g., when compiled and executed, to operate as a special purpose computer to perform the various functions described herein. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the present disclosure or the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., the location server such as an LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that can span multiple Physical Resource Blocks (PRBs) within N (one or more) consecutive symbol(s) within a slot. A PRB is a collection of REs spanning a quantity of consecutive symbols in the time domain and a quantity of consecutive sub-carriers in the frequency domain. In an OFDM symbol, a PRS resource occupies consecutive PRBs. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting patter configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS that is received by multiple TRPs instead of sending a separate UL-SRS for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS signal in a PRS/SRS signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS signal pair may be transmitted from the TRP and the UE, respectively, within about 10 ms of each other. With SRS signals being sent by UEs, and with PRS and SRS signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

UE-UE PRS Measurement and/or Transmission

Positioning accuracy (i.e., the accuracy of a determined position estimate) may be improved in a variety of ways. For example, positioning accuracy typically improves as more measurements relative to more reference points (e.g., more TRPs) are obtained. Networks are typically deployed, e.g., with a quantity of TRPs and locations of TRPs based on expected communication needs, not based on positioning accuracy. A network configured for communication needs may not provide sufficient positioning accuracy. For example, there may be null zones defined by boundaries within which there are insufficient PRS, e.g., insufficient line-of-sight (LOS) PRS, available from base stations to determine a location of a UE, at least with adequate accuracy. For example, if a unique two-dimensional location is desired, then at least three distinct signals need to be measured. Even if three signals are available, however, an adequate accuracy may still not be achievable, e.g., if time information for one or more of the signals is unacceptably inaccurate. What constitutes adequate accuracy of a location may depend on the application (e.g., use case) and/or circumstances. For example, while outdoors for use in a sports tracking app (e.g., walking, hiking, swimming, etc.) an accuracy of 1 m may be adequate (acceptable), indoors for use in an equipment tracking app (e.g., for items on an assembly line) an accuracy of 20 cm or less may be needed. These are examples, and countless other accuracy thresholds are possible. Also, a UE may have a good communication link with a serving base station while the UE is in a null zone.

A greater quantity of base stations, and thus TRPs, in a network may provide for higher positioning accuracy, but may come with a significant cost because base stations are expensive. A TRP, e.g., the TRP 300, may be a node configured to send PRS (DL-PRS) and receive and measure PRS (UL-PRS). Each TRP may be a base station (e.g., a gNB) or controlled by a base station (e.g., a gNB). A TRP may include an LMF (discussed more fully below), i.e., may have an LMF attached to the TRP (i.e., the node for sending and receiving PRS) in that the LMF may communicate directly with the TRP and/or be co-located with the TRP.

Positioning accuracy may be improved by using UEs as reference points (i.e., anchor UEs) for determining the location of target UE. For example, positioning accuracy may be improved by using UE-to-UE sidelink positioning signal transmission and/or measurement, UL-PRS reception and measurement by a target UE and/or one or more anchor UEs, and/or DL-PRS transmission by one or more anchor UEs and/or the target UE, thus adding to the number of positioning signal sources and thus the number of reference points for determining a location of the target UE. The increased number of reference points may yield, for example, an increased number of ranges to known locations for use in trilateration, resulting in reduced uncertainty in a determined position estimate.

UEs that are configured to exchange positioning reference signals other than sending UL-PRS or receiving and measuring DL-PRS may be referred to as premium UEs and may include mobile or stationary UEs. For example, a premium UE may be a roadside unit (RSU) (also known as a roadside equipment (RSE)) that is part of a C-V2X infrastructure (e.g., disposed on a roadside structure such as a lamp post, a building surface, etc.) and may transmit and/or receive PRS to/from other UEs. The premium UE may receive and measure SL-PRS (sidelink PRS) from other UEs, and/or may transmit SL-PRS to other UEs that the other UEs may measure, and/or may receive and measure UL-PRS, and/or may transmit DL-PRS.

A premium UE may differ from a base station in a variety of ways. For example, a premium UE may be configured to communicate with other UEs using one or more sidelink channels (that have different protocols than cell channels), may lack a connection to a wired backhaul, and may lack the ability to configure RRC (Radio Resource Control) signaling of other UEs. For example, the premium UE may provide some dynamic information using the sidelink (e.g. scheduling of a sidelink channel or signal like PSSCH (physical sidelink shared channel), or aperiodic sidelink CSI-RS, or aperiodic sidelink SRS) but may not provide semi-static signaling configuration information to other UEs to schedule or control positioning reference signal transmission (e.g., provide semi-static parameters regarding how and when to transmit positioning SRS). A base station, for example, may be configured to configure a UE to transmit positioning SRS periodically, aperiodically, or semi-persistently. For semi-persistent transmissions, the positioning SRS transmission may be triggered by a base station or a premium UE. Cell channels use NR technology and signals sent over cell channels conform to (i.e., are sent in accordance with) different protocols than signals sent over sidelink channels.

Figure 5:
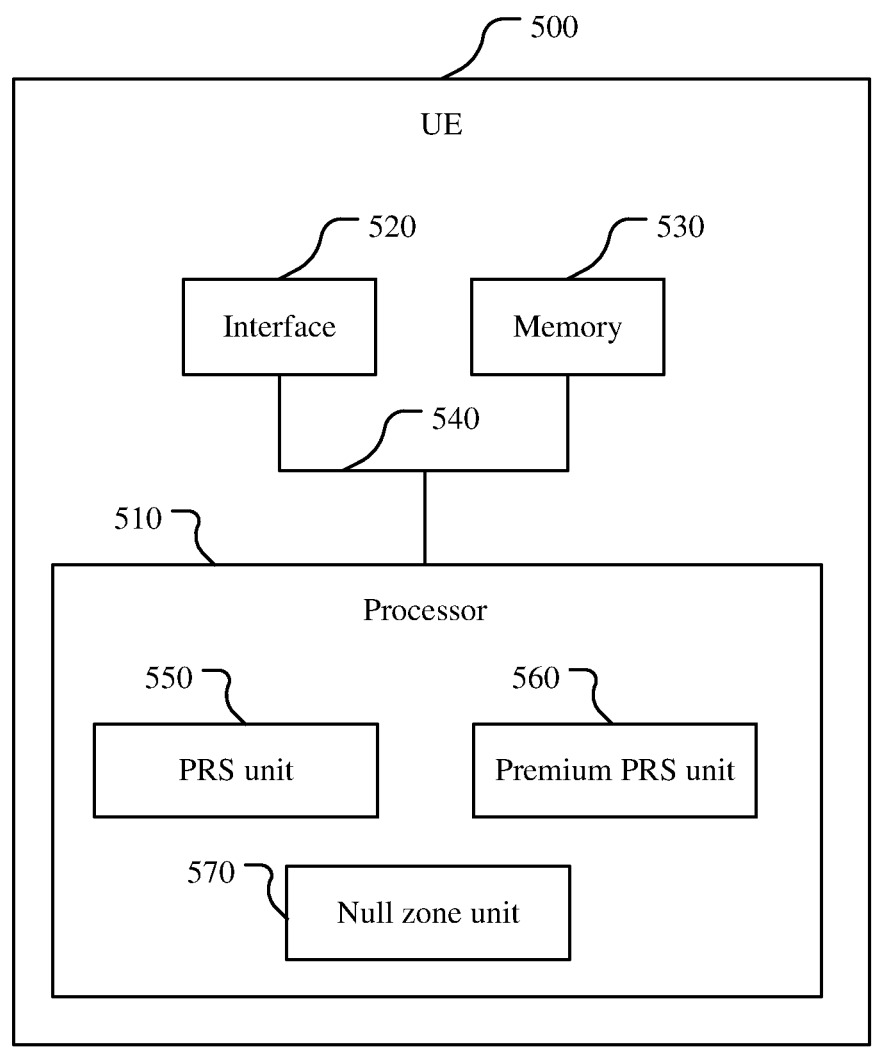
FIG. 5 is a block diagram of an example of the user equipment shown in FIG. 2.

FIG. 5 illustrates a UE 500, which may be an example of the UE 200 shown in FIG. 2, and includes a processor 510, an interface 520, and a memory 530 communicatively coupled to each other by a bus 540. The UE 500 may include the components shown in FIG. 5, and may include one or more other components such as any of those shown in FIG. 2. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function.

The processor 510 (possibly in conjunction with the memory 530 and, as appropriate, the interface 520) may include a PRS unit 550, a premium PRS unit 560, and/or a null zone unit 570. The PRS unit 550 is configured to send UL-PRS via the interface 520 and to receive, via the interface 520, and measure DL-PRS. The premium PRS unit 560 is configured to receive and measure SL-PRS (sidelink PRS) from other UEs, and/or to transmit SL-PRS to other UEs that the other UEs may measure, and/or to receive and measure UL-PRS, and/or to transmit DL-PRS. The null zone unit 570 is configured to determine whether the UE 500 is in a null zone and/or is expected to be in a null zone. Functionality of the premium PRS unit 560 and the null zone unit 570 are discussed further below, and the description may refer to the processor 510 generally, or the UE 500 generally, as performing any of the functions of the premium PRS unit 560 and/or the null zone unit 570.

The premium PRS unit 560 may be configured to measure UL-PRS and/or SL-PRS. For example, the premium PRS unit 560 may be configured to measure positioning SRS (UL-PRS) sent by another UE, received by the interface 520 (e.g., the antenna 246 and the wireless receiver 244), and received by the processor 510 from the interface 520. The UL-PRS occupy UL resources, being transmitted on an uplink channel (e.g., PUSCH (physical uplink shared channel), PUCCH (physical uplink control channel)). Also or alternatively, the premium PRS unit 560 may be configured to measure sidelink positioning reference signals (SL-PRS) received from the interface 520, which were received by the interface 520 (e.g., the antenna 246 and the wireless receiver 244). The SL-PRS, while having an SL configuration (i.e., conforming to an SL protocol) and being transmitted on a sidelink channel, may have a format of UL-PRS or DL-PRS or other (reference) signal, e.g., similar or the same sequence, time-frequency pattern within a slot, and/or pattern over slots (e.g., number of resources, resource time gap, resource repetition factor, muting pattern). As another example, the SL-PRS may be an SL signal repurposed for positioning, such as SL-PSS (SL primary synchronization signal), SL-SSS (SL secondary synchronization signal), SL-CSI-RS (SL channel state information reference signal), SL-PTRS (SL phase tracking reference signal). As another example, the SL-PRS may be a sidelink channel (e.g. PSBCH (physical sidelink broadcast channel), PSSCH (physical sidelink shared channel), PSCCH (physical sidelink control channel), with the corresponding DMRS included or not) repurposed for positioning. The premium PRS unit 560 may be configured to receive assistance data from a base station and to use the assistance data to measure the received PRS (e.g., positioning SRS or SL-PRS). The assistance data may include, for example, RSTD (including expected RSTD and RSTD uncertainty) for TDOA-based positioning.

Also or alternatively, the premium PRS unit 560 may be configured to send SL-PRS. The premium PRS unit 560 may be configured to send SL-PRS to another UE via the interface 520 (e.g., the wireless transmitter 242 and the antenna 246), with the SL-PRS having a sidelink configuration (i.e., being sent in accordance with a sidelink protocol) and being sent on a sidelink channel. The premium PRS unit 560 may be configured to produce the SL-PRS with a format of or similar to DL-PRS, or of positioning SRS (UL-PRS). As another example, the premium PRS unit 560 may be configured to produce the SL-PRS as a sidelink reference signal (SL-RS) such as SL-PSS, SL-SSS, SL-CSI-RS, SL-PTRS repurposed for positioning. As another example, the premium PRS unit 560 may produce the SL-PRS as an SL channel (e.g., PSBCH, PSSCH, PSCCH), repurposed for positioning, with the corresponding DMRS included or not. The premium PRS unit 560 may be configured to produce the SL-PRS with repetition, beam sweeping (through different SL-PRS resources), and/or muting occasions (i.e., zero-power SL-PRS) similar to DL-PRS.

The null zone unit 570 may be configured to determine that the UE 500 has entered a null zone. Thus, the null zone unit 570 may be configured to determine a current presence of the UE 500 in a null zone (i.e., that the UE 500 is presently in a null zone) and/or a future presence of the UE 500 in a null zone. The null zone unit 570 may determine that the UE 500 is presently in a null zone in response to detecting one or more outlier conditions. For example, the null zone unit 570 may determine that the UE 500 is presently in a null zone in response to detecting an unexpectedly significant change in positioning information (e.g., estimated location, a positioning signal measurement, etc.) output by a Kalman filter, e.g., a change in Kalman filter output exceeding a threshold. As another example, the null zone unit 570 may determine that the UE 500 is presently in a null zone in response to detecting a signal-and-interference-to-noise ratio (SINR) that is below an acceptable threshold SINR. As another example, the null zone unit 570 may determine an estimated present location of the UE 500 using one or more techniques independent of, and/or in addition to, presently-received base station PRS (e.g., using dead reckoning, using image capture and comparison to locations corresponding to images, etc.) and determine that the UE 500 is in a null zone based on the estimated present location and a boundary of the null zone. Still other techniques, and/or a combination of two or more techniques, may be used by the null zone unit 570 to determine that the UE 500 is presently in a null zone.

The null zone unit 570 may be configured to determine that the UE 500 is expected to enter a null zone. For example, the null zone unit 570 may analyze information regarding a future location of the UE 500 and a boundary of a null zone to determine whether the UE 500 will be in the null zone in the future. The information regarding the future location may be calculated by the null zone unit 570. For example, the null zone unit may calculate an expected future location of the UE 500, and corresponding time, based on a present and/or prior estimated location of the UE 500 and motion information regarding the UE 500 such as a present velocity or a present trajectory. As another example, the null zone unit 570 may use a provided location of the UE 500, e.g., a location entered into a calendar of a user of the UE 500, and a boundary of the null zone to determine whether the UE 500 will be in the null zone in the future.

The null zone unit 570 may be configured to report presence (current and/or future) of the UE 500 in a null zone to one or more other entities, such as one or more network entities (e.g., a TRP, a server) and/or one or more other UEs. The report of the presence in a null zone may be explicit or implicit (e.g., a request for UE-UE PRS exchange). The null zone unit 570 may be configured to report the presence in the null zone in real time (e.g., as soon as possible) and/or at a later time, e.g., when a communication link is established if there is no communication link between the UE 500 and a TRP 300 when the presence in the null zone is determined.

The null zone unit 570 may be configured to determine a null zone and/or to assist another entity, e.g., the server 400, determine a null zone by crowdsourcing location information. The null zone unit 570 may, for example, determine positioning-quality pairs of each containing an estimated location of the UE 500 and a corresponding location uncertainty. The null zone unit 570 may record and analyze the positioning-quality pairs and determine boundaries of null zones corresponding to regions of location uncertainty above a threshold acceptable location uncertainty. Also or alternatively, the processor 510 may report the positioning-quality pairs to another entity such as the TRP 300 and/or the server 400, and TRP 300 and/or the server 400 (e.g., the UE-UE PRS unit 360 and/or the UE-UE PRS unit 460) may analyze the positioning-quality pairs received from the UE 500 and/or one or more other UEs to determine boundaries of null zones. The reported positioning-quality pairs may be used, for example, by the TRP 300 and/or the server 400 to determine whether the UE 500 would be a candidate to be an anchor UE. Also or alternatively, the null zone unit 570 may record and/or report estimated locations of the UE 500 (e.g., based on dead reckoning, etc.) corresponding to an unexpectedly large change in positioning information. The null zone unit 570 and/or another entity may use these locations to determine null zone boundaries. Collecting multiple samples for similar locations over time may help the null zone unit 570 and/or another entity determine null zone boundaries despite some false positive and/or false negative data points. Similar to determining null zone boundaries, hot zones (where sufficient base station PRS are present for determining position with acceptable accuracy) may be determined.

Referring again to FIGS. 3 and 4, the processor 310 (possibly in conjunction with the memory 311 and, as appropriate, the transceiver 315 (or one or more portions thereof)) may include a UE-UE PRS unit 360 and/or the processor 410 (possibly in conjunction with the memory 411 and, as appropriate, the transceiver 415 (or one or more portions thereof)) may include a UE-UE PRS unit 460. The UE-UE PRS unit 360 may include a location management function (LMF). Either or both of the UE-UE PRS units 360, 460 may be configured to determine a presence of the UE 500 in a null zone using one or more techniques discussed above with respect to the null zone unit 570. Either or both of the UE-UE PRS units 360, 460 may be configured to obtain (e.g., produce, retrieve from memory, etc.) and send one or more PRS configurations for one or more corresponding anchor UEs to facilitate PRS exchange between the target UE and one or more anchor UEs. Functionality of the UE-UE PRS units 360, 460 are discussed further below, and the description may refer to the processor 310, 410 generally, or the TRP 300 generally, or the server 400 generally, as performing any of the functions of the UE-UE PRS units 360, 460, respectively.

Figure 6A:
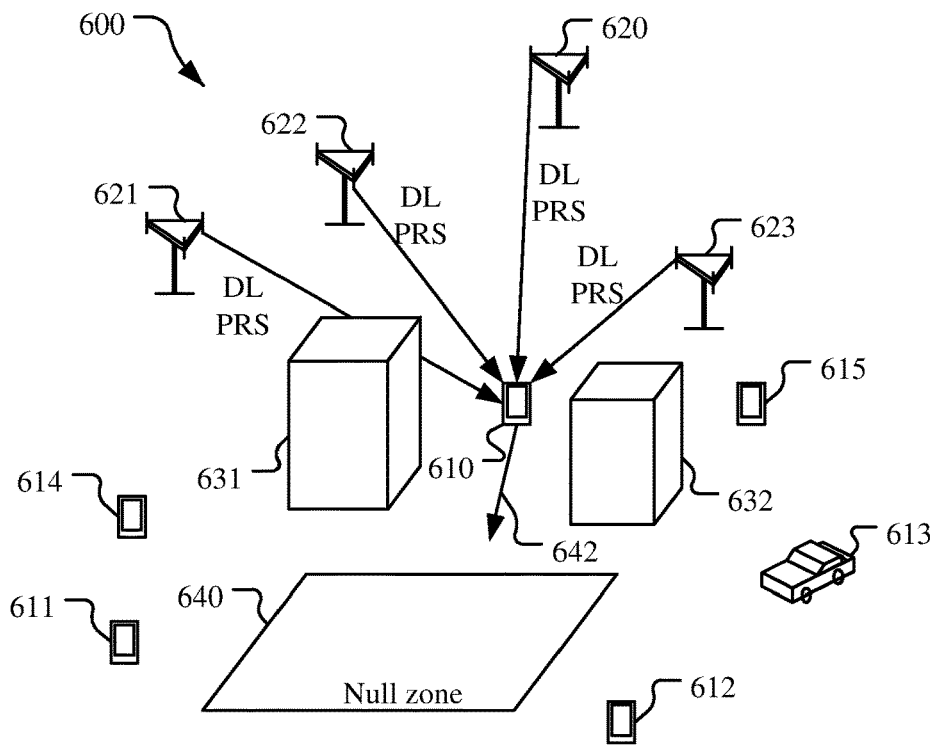
FIG. 6A is a simplified diagram of an outdoor environment with a UE moving toward a null zone.
Figure 6B:
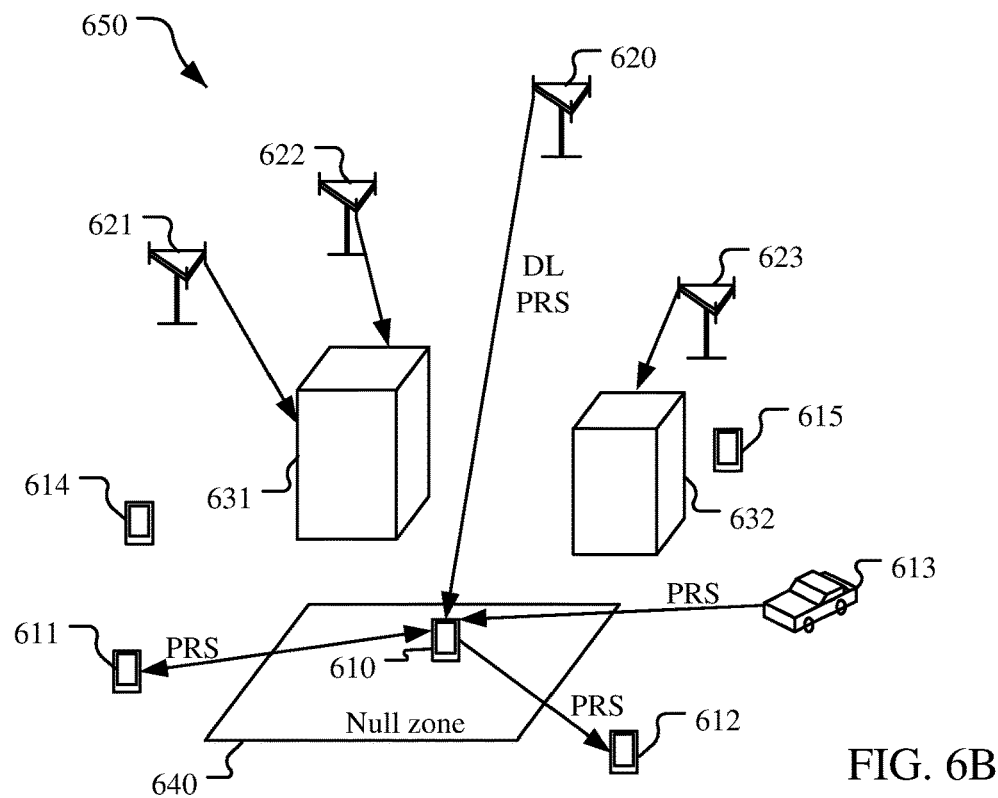
FIG. 6B is a simplified diagram of the outdoor environment shown in FIG. 6A with the UE disposed in the null zone.

FIG. 6A and FIG. 6B illustrate environments 600, 650 that include multiple UEs 610, 611, 612, 613, 614, 615, multiple base stations 620, 621, 622, 623, objects 631, 632 (here buildings), and a null zone 640. In the environment 600, the UE 610 is outside of the null zone 640 and is moving toward the null zone 640 such that the UE 610 is expected to move into the null zone 640 based on a present velocity vector 642. In the environment 600, the UE 610 has LOS with all four of the base stations 620-623. In the environment 650, the UE 610 has moved into the null zone 640, and now has LOS with only the base station 620 of the base stations 620-623, but is now exchanging PRS with the UEs 611-613 to facilitate determination of the position of the UE 610, e.g., enabling position determination and/or improving position accuracy compared to not exchanging PRS with the UEs 611-613. The environments 600, 650 are examples only, provided to help illustrate techniques discussed herein.

Figure 7A:
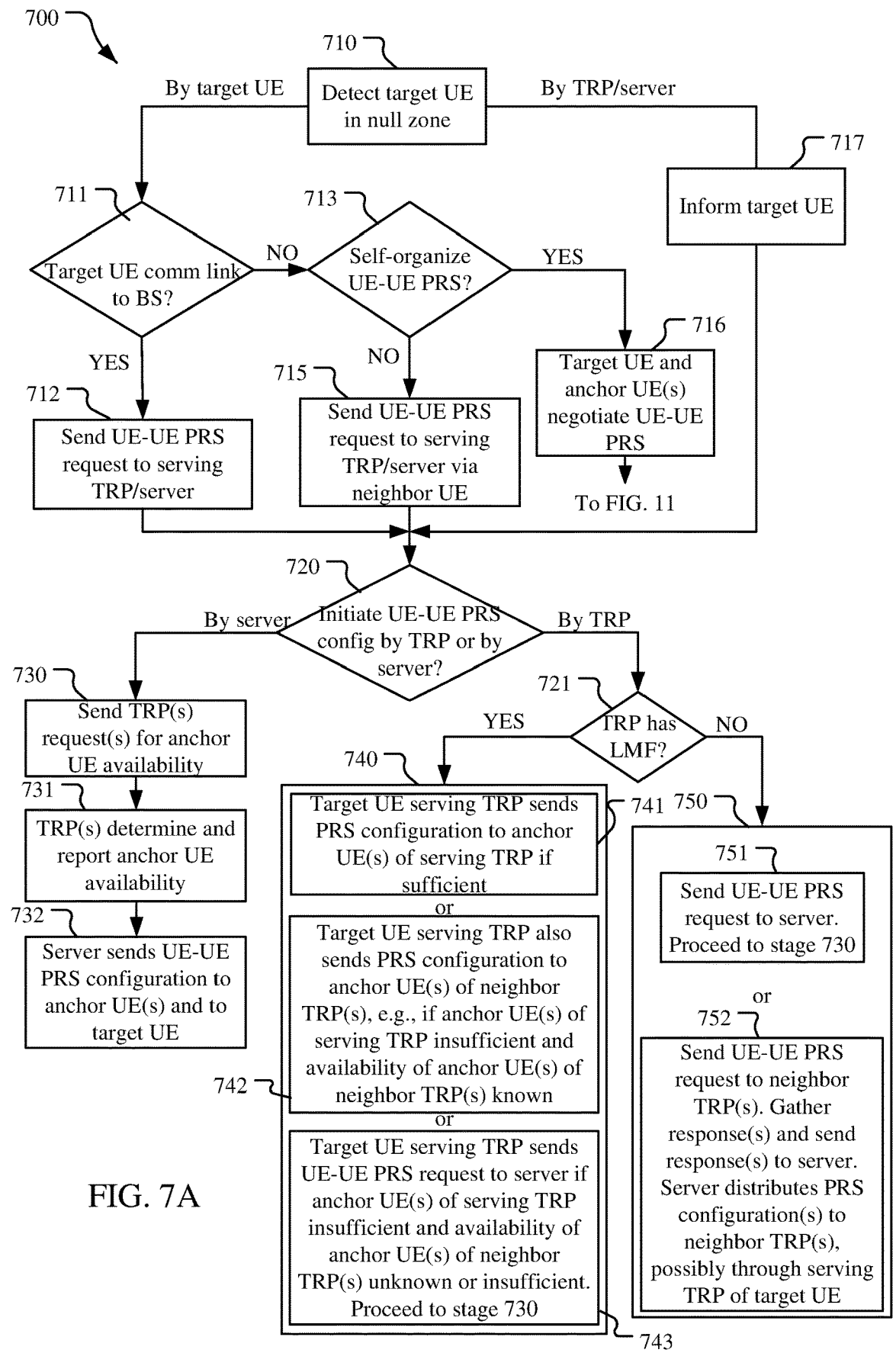
FIGS. 7A and 7B are block diagrams of an example flow of operations and operational contingencies.
Figure 7B:
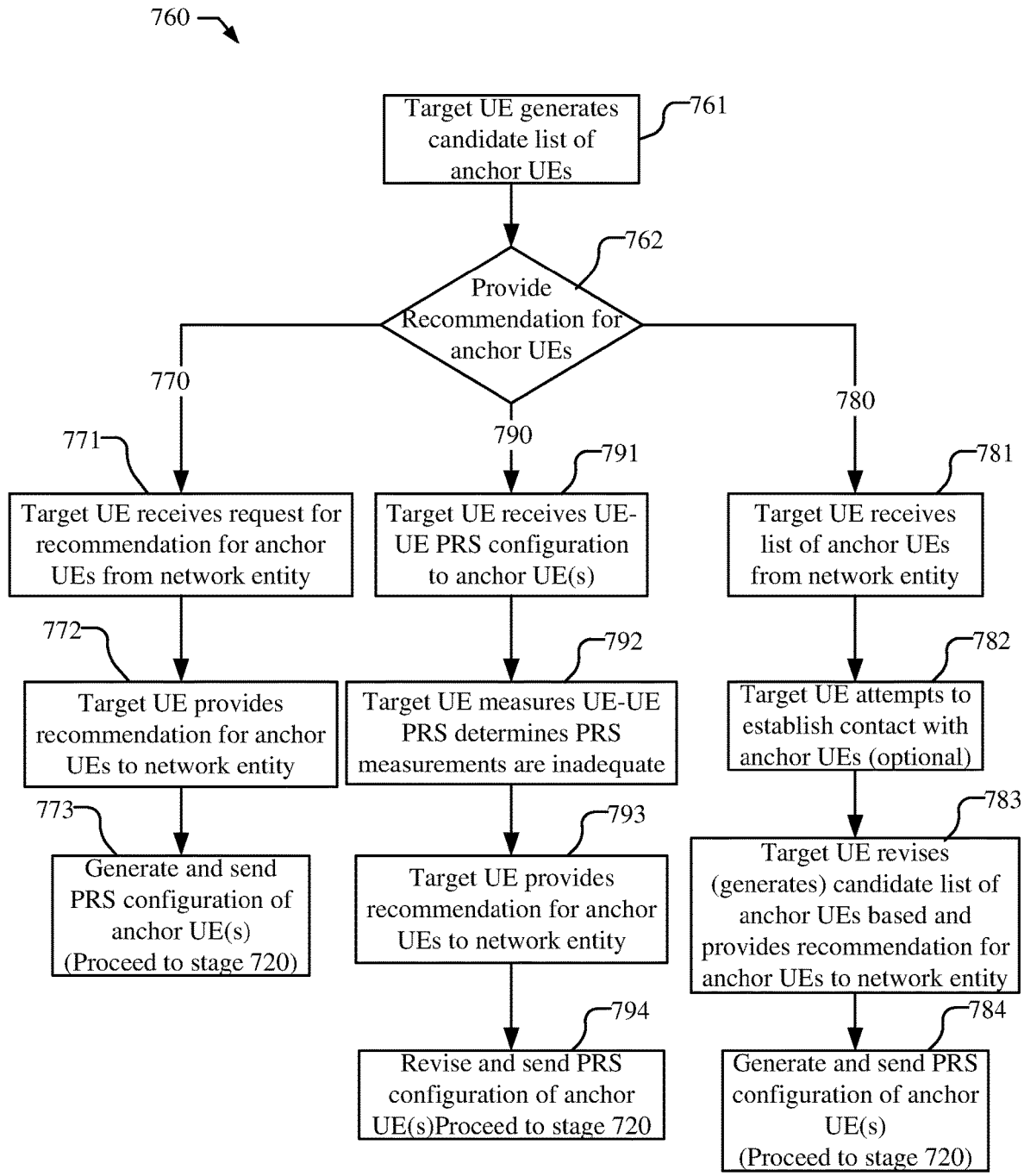

FIGS. 7A and 7B, with further reference to FIGS. 1-6 and 8-12, illustrate flow 700 and flow 760, respectively, which include blocks indicating operations and operational contingencies for configuring UEs with PRS configurations for UE-UE PRS exchange, i.e., exchange of one or more PRS signals between two separate UEs. The operational contingency blocks may represent contingencies based on conditions (e.g., structural configuration conditions) and not necessarily decisions that are made. FIGS. 8-12 include signal and processing flows 800, 900, 1000, 1100, and 1200 for determining presence of a UE in a null zone, initiating UE-UE PRS exchange by the server 400 (e.g., an LMF), and UE-UE PRS exchange by a TRP 300, and recommending one or more anchor UE(s) for sidelink-assisted positioning, respectively. In FIGS. 8-12, a target UE 500-1 and anchor UEs 500-2, 500-3 are each an example of the UE 500, with the premium PRS unit 560 and/or the null zone unit 570 being optional in each of the UEs 500-1, 500-2, 500-3. The target UE 500-1 is the UE for which the position is desired, and that may enter the null zone 640, e.g., the UE 610 in FIGS. 6A, 6B. A TRP 300-1 is a serving TRP of the target UE 500-1, and a TRP 300-2 is a serving TRP of the anchor UE 500-2. The TRP 300-1, as discussed below, may include an LMF. The discussion of FIGS. 7A-12 references FIGS. 6A and 6B to facilitate understanding, but the discussion has applicability beyond FIGS. 6A and 6B.

At block 710, the presence of the target UE 500-1 in a null zone is detected to initiate UE-UE PRS exchange. The presence may be a current presence or future presence in the null zone 640. The presence may be detected, and thus the UE-UE PRS exchange initiated, by the UE 500-1 at stage 810 and/or the TRP 300 at stage 850 and/or the server 400 at stage 860, e.g., by the null zone unit 570 and/or the UE-UE PRS unit 360 and/or the UE-UE PRS unit 460. If the presence in the null zone is detected by the target UE 500-1, then the flow 700 proceeds to block 711, and if the null zone is detected by the TRP 300 or server 400, then the flow 700 proceeds to block 717 (discussed below after the discussion of block 716).

At block 711, the target UE 500-1 determines whether the target UE 500-1 has an acceptable communication link with the serving TRP 300-1. If the target UE 500-1 determines that the target UE 500-1 has an acceptable communication link with the serving TRP 300-1, then the flow 700 processed to block 712, and proceeds to block 713 if the target UE 500-1 determines that the target UE 500-1 has an unacceptable communication link with the serving TRP 300-1.

At block 712, the target UE 500-1 sends a UE-UE PRS request to the serving TRP 300-1 for the target UE 500-1 and/or to the server 400. For example, at stage 820 the target UE 500-1 may send a UE-UE PRS request message to the TRP 300-1 serving the target UE 500-1 and/or a UE-UE PRS request message to the server 400 via LPP protocol. The request may be sent to the serving TRP 300-1 through the Uu interface, e.g., as part of UCI (Uplink Control Information) or as part of a MAC-CE (Media Access Control-Control Element). The UE-UE PRS request message may explicitly request to have PRS signal exchange with at least one other UE or may implicitly request to have PRS signal exchange with at least one other UE, e.g., by indicating the detected presence of the target UE 500-1 in the null zone 640. The UE-UE PRS request message may suggest one or more anchor UEs, e.g., UEs that are in communication range of the target UE 500-1 and that have low position uncertainty. The suggestion of one or more anchor UEs by the target UE for sidelink-assisted positioning is further discussed in reference to FIG. 7B. The PRS signal exchange may be SL-PRS over a sidelink channel, UL-PRS over a UL channel, and/or DL-PRS over a DL channel. The flow 700 proceeds to block 720 to initiate UE-UE PRS configuration assignment.

At block 713, with an unacceptable (e.g., absent) communication link with the serving TRP 300-1, the target UE 500-1 may determine whether the target UE 500-1 will self-organize UE-UE PRS exchange. If the target UE 500-1 determines not to self-organize UE-UE PRS exchange, then the flow 700 proceeds to block 715, and proceeds to block 716 if the target UE 500-1 determines to self-organize UE-UE PRS exchange. There may not be a decision at block 713, e.g., if the target UE 500-1 is not configured to self-organize UE-UE exchange.

At block 715, the target UE 500-1 sends a UE-UE PRS request to the serving TRP 300-1 and/or to the server 400 via a neighbor UE, which may be, e.g., a relay node for the target UE 500-1 to maintain connection with the TRP 300-1 and server 400. For example, the target UE 500-1 sends the UE-UE PRS request to a UE within communication range (e.g., sidelink communication range) of the target UE 500-1. For example, at stage 830 the target UE 500-1 may send the UE-UE PRS request to the anchor UE 500-2. This is an example only for sake of simplicity and consistency of FIGS. 8-10, and the target UE 500-1 may send the request to any neighbor UE (i.e., any UE within communication range) regardless of whether that UE eventually becomes an anchor UE. The UE-UE PRS request message may suggest one or more anchor UEs, e.g., UEs that are in communication range of the target UE 500-1 and that have low position uncertainty. The anchor UE 500-2 sends a corresponding UE-UE PRS request, indicating that the request is on behalf of the target UE 500-1, through the Uu interface (e.g., as part of UCI or MAC-CE) to the TRP 300-2 that is the serving TRP of the anchor UE 500-2. The TRP 300-2 sends a corresponding UE-UE PRS request, indicating that the request is on behalf of the target UE 500-1, to the TRP 300-1 and/or to the server 400. The TRP 300-1 may send a corresponding UE-UE PRS request, indicating that the request is on behalf of the target UE 500-1, to the server 400. The flow 700 proceeds to block 720 to initiate UE-UE PRS configuration.

At block 716, with the target UE 500-1 self-organizing the UE-UE PRS, the target UE 500-1 communicates with one or more UEs to determine whether the UE(s) are available to be anchor UE(s) and if so, then to negotiate UE-UE PRS with the anchor UE(s). For example, at stage 840, the target UE 500-1 may send a UE-UE PRS request to the anchor UE 500-3 to request whether the UE 500-3 is available for UE-UE PRS exchange. The anchor UE 500-3 is available for the UE-UE PRS exchange if the anchor UE 500-3 is configured to exchange PRS with the target UE 500-1 as desired by the target UE 500-1 and has available resources for such exchange. The desired PRS exchange may depend on the positioning technique to be implemented (e.g., by the target UE 500-1 or the server 400) to determine the location of the target UE 500-1. The desired PRS exchange may be for SL-PRS to and/or from the target UE 500-1, DL-PRS to and/or from the target UE 500-1, and/or UL-PRS to and/or from the target UE 500-1. If the UE 500-3 is available for UE-UE PRS exchange, then the target UE 500-1 and the anchor UE 500-3 may engage in PRS configuration negotiation at stage 840 to determine the PRS configuration, e.g., the PRS parameters that will be used by each of the UEs 500-1, 500-3, for the UE-UE PRS exchange. With the PRS configuration determined, PRS exchange may begin as discussed with respect to FIG. 11.

At block 717, with the presence of the target UE 500-1 in the null zone 640 detected by the TRP and/or the server 400, the target UE 500-1 is informed of the null zone presence. For example, having determined the null zone presence at stage 850 and/or stage 860, respectively, the TRP 300-1 and/or the server 400 may send a respective null zone message at stage 870 to the target UE 500-1. The null zone message indicates to the target UE 500-1 that the target UE 500-1 will be involved in UE-UE PRS exchange. The null zone message(s) may not be sent to the target UE 500-1, e.g., if the PRS configuration implemented will be transparent to the target UE 500-1, e.g., if unicast DL-PRS (from a TRP) that would be measured by the UE 500-1, but that cannot reach the target UE 500-1, is replaced by DL-PRS from an anchor UE (e.g., with identical PRS configuration parameters). The flow 700 proceeds to block 720 to initiate UE-UE PRS configuration.

At block 720, determining and sending the UE-UE PRS configuration may be initiated by the TRP 300-1 or the server 400. If the detected null zone presence of the target UE 500-1 is a future presence, then the determining of the UE-UE PRS configuration may be proactive, before the target UE 500-1 enters the null zone 640. Thus, anchor UEs may be proactively searched for and configured (reconfigured) for UE-UE PRS exchange with the target UE 500-1. This may help maintain positioning of the target UE 500-1 as the target UE 500-1 moves from outside the null zone 640 to inside the null zone 640. If the UE-UE PRS configuration assignment is initiated by the TRP 300-1, then the flow 700 proceeds to block 721 and if the UE-UE PRS configuration assignment is initiated by the server 400, then the flow 700 proceeds to block 730. At block 721, if the TRP 300-1 has an LMF (LMF in the RAN), then the flow 700 proceeds to block 740 and if the TRP 300-1 does not have an LMF, then the flow 700 proceeds to block 750.

At block 730, the server 400 may send one or more TRPs 300 one or more corresponding requests for anchor UE availability, i.e., availability of one or more UEs to be anchor UEs. For example, at stage 910, the server 400 (e.g., the UE-UE PRS unit 460) may send a UE-UE PRS request (in accordance with LPPa) to each of the TRPs 300-1, 300-2. The server 400 may know locations of UEs served by the TRPs 300-1, 300-2 one or more of the requests sent to the TRPs 300-1, 300-2 may request the availability of one or more UEs that the server 400 determines to be good candidates for being anchor UEs, e.g., one or more neighbor UEs (of the target UE 500-1) that are (or will be) close to (within a threshold distance of) the target UE 500-1 and/or that are (or will be) close to (within a threshold distance of), but outside of, the null zone 640 (e.g., in a hot zone) and/or that have low location uncertainties. For example, the server 400 may identify the UEs 611, 612, 613 as good candidates for being anchor UEs and identify the UEs 614, 615 as not being good candidates for being anchor UEs (or at least not identify the UEs 614, 615 as being good candidates for being anchor UEs). One or more of the requests may request UE availability without identifying any specific UEs.

At block 731, one or more TRPs 300 that receive a request at block 730 determine and report anchor UE availability. For example, the TRPs 300-1, 300-2 may determine whether UEs have available resources having desired PRS parameters, e.g., desired frequency layers, point-As, etc. One or more of the TRPs 300-1, 300-2 may communicate with the UEs to determine availability. For example, at stage 920, the TRPs 300-1, 300-2 send respective availability requests to UEs, in this example, the UEs 500-2, 500-3. The TRPs 300-1, 300-2 may send availability requests (e.g., as part of DCI (Downlink Control Information) and/or MAC-CE according to RRC) to more than one UE. The availability requests may request information regarding, for example, available power at the UE, willingness of the UE to be an anchor UE (e.g., lack of higher priorities preventing or inhibiting serving as an anchor UE), etc. Stage 920, however, may be omitted, e.g., if the TRP 300 or the server 400 will not factor in responses by the UEs for determining anchor UEs. For example, while in a commercial setting (e.g., with UEs being smartphones of private users), forcing UEs to be anchor UEs may not be desirable, in some settings (e.g., a factory with UEs being robots) the server 400 may force UEs to be anchor UEs, e.g., if the UEs meet one or more PRS parameter criteria regardless of other factors. Any of the UEs 500-2, 500-3 that receive an availability request may send an availability response to the respective TRP 300-1, 300-2. The TRPs 300-1, 300-2 may determine whether UEs are available to serve as anchor UEs. At stage 930, the TRPs 300-1, 300-2 may send availability messages to the server 400 indicating any UEs that are available to serve as anchor UEs and/or indicating values of parameters (e.g., PRS parameters, power level, etc.) that the server 400 may use to determine which UEs are available to serve as anchor UEs.

At block 732, the server 400 collects and analyzes the information regarding anchor UE availability and sends UE-UE PRS configuration(s) to the anchor UE(s) and to the target UE 500-1. The server 400, e.g., the UE-UE PRS unit 460 determines the PRS configuration for each UE to serve as an anchor UE and sends the respective PRS configuration to the appropriate TRP(s) 300 for forwarding to the anchor UE(s) to cause the anchor UE(s) to reserve the appropriate resources, e.g., SL resources. For example, at stage 940, the server 400 may send the UE-UE PRS configuration for the anchor UE 500-3 to the TRP 300-1, and the TRP 300-1 may forward the UE-UE PRS configuration to the anchor UE 500-3. Also at stage 940, the server 400 may send the UE-UE PRS configuration for the anchor UE 500-2 to the TRP 300-2 (either directly or via the TRP 300-1), and the TRP 300-2 may forward the UE-UE PRS configuration to the anchor UE 500-2. At stage 950, the server 400 may send the UE-UE PRS configuration(s) for the anchor UE(s) to the target UE 500-1 to facilitate the target UE 500-1 measuring PRS from the anchor UE(s) and/or to transmit PRS appropriately to facilitate the anchor UE(s) measuring PRS from the target UE 500-1. The server 400 may send the PRS configuration(s) to the target UE 500-1 via the serving TRP 300-1 of the target UE 500-2. Also or alternatively, the server 400 may send the PRS configuration(s) to the target UE 500-1 via the another TRP, here the TRP 300-2, e.g., if the target UE 500-1 has a poor or non-existent communication link with the TRP 300-1. The PRS configuration may be periodic, semi-persistent, or aperiodic (P/SP/A). The PRS configuration may indicate to use SL, DL, and/or UL channels. The PRS configuration for SL-PRS may have the same format as DL-PRS or UL-PRS.

The PRS configuration (i.e., the UE-UE PRS configuration) may result in PRS that is transparent to the target UE 500-1. For example, the PRS configuration may be sent unicast to each appropriate anchor UE and may assign each anchor UE to fill a PRS resource that would be filled by a unicast PRS resource sent from a TRP to the target UE 500-1, e.g., in a default PRS configuration that includes unicast PRS from TRP(s) to the target UE 500-1. For example, if unicast PRS signals from M TRPs are blocked from reaching the target UE 500-1 in a comb-N PRS configuration (where N>M), then the server 400 may assign M anchor UEs to transmit the identical (at least from the target UE perspective) PRS signals sent by the M TRPs. The anchor UE PRS thus replace the blocked TRP PRS. This procedure is transparent to the target UE 500-1 as the mapping between the blocked TRPs and the anchor UEs is known to the server 400.

At block 740, with the serving TRP 300-1 having an LMF (location management function), e.g., in the UE-UE PRS unit 360, the serving TRP 300-1 may initiate PRS configuration assignment in a variety of ways. The LMF in the TRP 300-1, for example, may provide the PRS configuration to the target UE 500-1 transmitted using LPP, DCI, MAC-CE, RRC, etc. Having an LMF in the TRP may help reduce positioning latencies by having the LMF closer to the UEs. For example, the latency for determining a UE position may be reduced from about 1 second, with the TRP not having an LMF, to about 0.1 seconds or even about 0.01 seconds with the TRP having an LMF, although these times are examples and not limiting of the techniques discussed herein. The TRP 300-1 may be able to assign PRS configuration or may request the server 400 to assign the PRS configuration.

At block 741, the TRP 300-1 assigns UE-UE PRS configuration to one or more anchor UEs that are served by the TRP 300-1. For example, the TRP 300-1 may have knowledge of the availability of UEs served by the TRP 300-1. The TRP 300-1, e.g., the UE-UE PRS unit 360 may determine the availability of one or more UE(s) served by the TRP 300-1. The TRP 300-1 may, at stage 1010, send a PRS configuration to the available anchor UE(s) served by the TRP 300-1, in this example, the anchor UE 500-3. The TRP 300-1 may be configured to assign the PRS configuration(s) to the anchor UE(s) served by the TRP 300-1 in response to determining that the anchor UE(s) served by the TRP 300-1 will, in combination with any TRPs that are not blocked in the null zone 640, will result in one or more positioning criteria, e.g., position uncertainty, being met.

At block 742, the TRP 300-1 may also send UE-UE PRS configuration to one or more neighbor TRPs (neighboring the TRP 300-1). For example, if the anchor UE(s) served by the TRP 300-1 are insufficient to result in the one or more positioning criteria being met, the TRP 300-1 may use knowledge of the availability of one or more anchor UEs served by one or more neighboring TRPs to assign UE-UE PRS configuration to the anchor UE(s) of the neighbor TPR(s). The TRP 300-1 may obtain knowledge of the availability of the UE(s) served by the neighbor TRP(s) by syncing with the neighbor TRP(s), e.g., similar to blocks 731 and 732. Thus, for example, the TRP 300-1 may send, at stage 1020, PRS configuration for one or more UE(s) served by one or more neighbor TRP(s) to the anchor UE(s) via the neighbor TRP(s), in this example, to the anchor UE 500-2 via the TRP 300-2 (i.e., send the PRS configuration to the TRP 300-2 over the Xn interface for forwarding to the anchor UE 500-2). The TRP 300-1 may send the PRS configuration at stage 1020 in addition to, or instead of, the PRS configuration sent at stage 1010.

At block 743, the TRP serving the target UE may send a UE-UE PRS request to the server in response to the anchor UE(s) served by the TRP serving the target UE being insufficient to result in meeting of the one or more positioning criteria, and the availability of UE(s) of neighbor TRP(s) is either unknown or would still not result in meeting the one or more positioning criteria. For example, at stage 1030, the TRP 300-1 may send a UE-UE PRS request to the server 400. The request sent at stage 1030 may be similar to the UE-UE PRS request sent at stage 820 by the target UE 500-1 to the server 400. The request sent at stage 1030 may trigger PRS configuration assignment by the server 400, with the flow 700 proceeding to block 730.

At block 750, with the serving TRP 300-1 lacking or not using an LMF, the serving TRP 300-1 may initiate PRS configuration assignment in a variety of ways. For example, the TRP 300-1 may request the server 400 to assign PRS configuration(s) or the TRP 300-1 may coordinate information gathering and PRS configuration assignment.

At block 751, the TRP 300-1 may request the server 400 to determine and assign PRS configuration(s). For example, at stage 1110, in response to receiving the UE-UE PRS request at stage 820 (e.g., through the Uu interface as part of UCI/MAC-CE in accordance with RRC) from the target UE 500-1, the TRP 300-1 may send a UE-UE PRS request to the server 400 via LPPa. The flow 700 may then proceed to block 730.

At block 752, the TRP 300-1 may coordinate PRS configuration determination and assignment. For example, at stage 1120, the TRP 300-1 may send an availability request to the TRP 300-2 (and/or to one or more other TRPs) for availability information regarding potential anchor UEs. The TRP 300-2, and any other TRPs to which requests were sent, send an availability response to the TRP 300-1 indicating any available anchor UEs and/or data from which anchor UEs may be identified. The TRP 300-1 gathers this anchor UE availability information and provides the anchor UE availability information to the server 400. The server 400 may select one or more anchor UE(s), if any, based on the UE availability information and possibly other information such as location(s) of the possible anchor UE(s) relative to the target UE 500-1 and/or relative to the null zone 640. At stage 1130, the server 400 may send the PRS configuration(s) to the respective TRPs, in this example, the TRPs 300-1, 300-2. Alternatively, at stage 1140, the server 400 may send the PRS configuration(s) to one TRP, e.g., the TRP that provided the anchor UE availability information, here the TRP 300-1, and that TRP may send the PRS configuration(s) to the other appropriate TRP(s).

The server 400 or the TRP, e.g., the TRP 300-1, may assign a default UE-UE PRS configuration (e.g., SL-PRS) to an anchor UE. The anchor UE may use the default configuration (e.g., default PRS parameters such as slot offset, point-A, frequency layer, etc.) to negotiate UE-UE PRS exchange with the target UE 500-1, e.g., at stage 840. The TRP may reserve certain resources for UE-UE positioning (e.g., certain SL-PRS resources) and the anchor UE(s) and the target UE 500-1 may use the reserved resources for the UE-UE PRS exchange, e.g., instead of negotiating the UE-UE PRS exchange.

Figure 12:
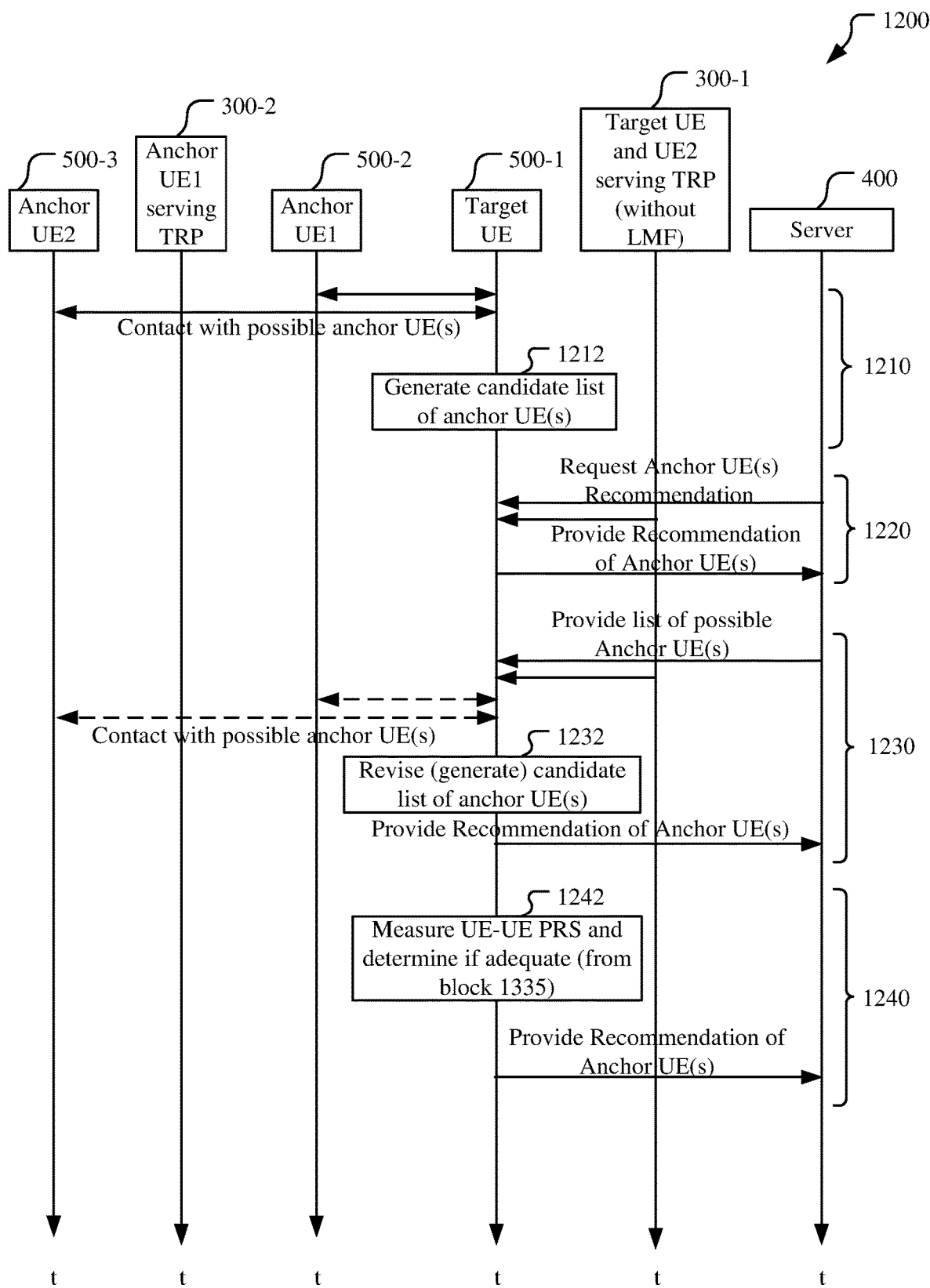
FIG. 12 is a signaling and process flow for recommending one or more anchor UEs to a network entity.

FIG. 7B, with further reference to FIGS. 1-6, 7A, and 12, illustrates flow 760 that include blocks indicating operations and operational contingencies for configuring UEs with PRS configurations for UE-UE PRS exchange, and in particular a process of suggesting to a network entity one or more anchor UEs that may be used for sidelink-assisted positioning of the target UE 500-1. The operational contingency blocks may represent contingencies based on conditions (e.g., structural configuration conditions) and not necessarily decisions that are made. FIG. 12 includes signal and processing flow 1200 for recommending one or more anchor UEs to a network entity for sidelink-assisted positioning of the target UE 500-1. While the process is discussed in reference to FIGS. 7B and 12, sometimes referred to flow 700, which is related to use of UE-UE PRS exchange in a null zone, the process of suggesting to a network entity one or more anchor UEs that may be used for sidelink-assisted positioning of the target UE 500-1 need not be limited to use cases involving a null zone. For example, in some implementations, a target UE 500-1 may suggest one or more anchor UEs that may be used for sidelink-assisted positioning when there is no null zone present.

At block 761, the target UE 500-1 may generate a candidate list of anchor UEs, e.g., by identifying one or more UEs that are available for a positioning reference signal exchange with the target UE 500-1 for sidelink-assisted positioning of the target UE 500-1. The candidate list of anchor UEs may be generated by the target UE 500-1 at one time, e.g., in response to a request from a network entity or detection of a current or future presence of the target UE 500-1 in the null zone, or the candidate list of anchor UEs may be generated and maintained by the target UE 500-1 over time. For example, at stage 1210, the target UE 500-1 may contact UEs 500-2 and 500-3 that may be available for a positioning reference signal exchange and serve as anchor UEs for the target UE 500-1 during sidelink-assisted positioning of the target UE 500-1. The target UE 500-1 may send, for example, an availability request to each UE 500-2 and 500-3 to determine their availability for a positioning reference signal exchange with the target UE 500-1 over a sidelink channel In some implementations, the target UE 500-1 may negotiate the capability of the other UEs 500-2 and 500-3, such as whether they support sidelink PRS, their power levels, etc. The other UEs 500-2 and 500-3 may be available for the UE-UE PRS exchange if the anchor UE 500-3 is configured to exchange PRS with the target UE 500-1 as desired by the target UE 500-1 and has available resources for such exchange. If the target UE 500-1 determines the availability of anchor UEs 500-2 and 5003, the server 400 or TRP 300-1 need not send a request to confirm availability of these UEs, as discussed in blocks 731, 742, and 743 in FIG. 7A. Additionally, the UEs 500-2 and 500-3 may provide information or coordinate in a signaling exchange with the target UE 500-1 to enable the target UE 500-1 to estimate a range to or a location of the UEs 500-2 and 500-3. For example, UEs 500-2 and 500-3 may provide location information or ranging signaling to the target UE 500-1. In other implementations, the target UE 500-1 may measure signal parameters, such as signal quality or strength, from the UEs 500-2 and 500-3.

At stage 1212, the target UE 500-1 may generate the candidate list of anchor UEs. The target UE 500-1, for example, may select candidates for anchor UE based on one or more factors, such as a range between the candidate UE and the target UE 500-1 or the quality of signal from the candidate UE. Estimated locations of the candidate UEs and the target UE 500-1 may additionally be used to select candidates UEs for a list of anchor UEs. For example, the locations may be used to determine the Geometric Dilution of Precision (GDOP), which may be used by the target UE 500-1 to select candidate UEs. In another example, the locations of UEs (and gNBs) may be used to determine the convex hull, which may be used by the target UE 500-1 select candidate UEs, e.g., based on the location of the target UE 500-1 (or the null zone) being inside the convex hull. Other factors that may be used by the UE 500-1 that may be determined by locations or signal parameters of the UEs 500-2 and 500-3 may include diversity in AoA and/or diversity in AoD. Any combination of the foregoing, as well as other factors, may be used by the target UE 500-1 to select candidates for anchor UEs.

At block 762, the candidate list of anchor UEs may be provided to a network entity, e.g., as a recommendation, in response to a request from the network entity (arm 770), in response to receipt of a list of possible anchor UEs from the network entity (arm 780), or in response to a determination that previously received UE-UE PRS configurations are inadequate (arm 790).

Within arm 770, at block 771, the target UE 500-1 may receive from a network entity a request for a recommendation of anchor UEs, i.e., a candidate list of anchor UEs. For example, at stage 1220, the server 400 or the TRP 300-1 may send a request for anchor UEs recommendation to the target UE 500-1. In some implementations, the target UE 500-1 may generate the candidate list of anchor UEs (illustrated at block 761 and stage 1212) in response to the request for a recommendation of anchor UEs. In other implementations, the target UE 500-1 may generate the candidate list of anchor UEs (illustrated at block 761 and stage 1212) before receiving the request for a recommendation of anchor UEs.

At block 772, the target UE 500-1 may provide a recommendation for anchor UEs to the network entity, e.g., the candidate list of anchor UEs. For example, at stage 1220, the target UE 500-1 provides the recommendation of anchor UEs to the server 400.

At block 773, the server 400 may generate and send a PRS configuration for one or more anchor UEs to the target UE 500-1 based on the recommendation received from the target UE 500-1. For example, the server 400 may compare the received list of candidate anchor UEs to a network generated list candidate anchor UEs and generate the PRS configuration for one or more anchor UEs based on common candidate anchor UEs. In another example, the server 400 may confirm whether any of the recommended anchor UEs are suitable and may generate the PRS configuration for one or more anchor UEs accordingly. The flow 760, for example, may proceed to block 720 in FIG. 7A, where the network entity may generate and send to the target UE 500-1 a UE-UE PRS configuration for anchor UEs.

Within arm 780, at block 781, the target UE 500-1 may receive from a network entity a list of anchor UEs, i.e., a candidate list of anchor UEs generated by the network entity, e.g., the server 400 or TRP 300-1. For example, as illustrated at stage 1230, the server 400 or TRP 300-1 may provide a list of possible anchor UEs to the target UE 500-1.

At optional block 782, the target UE 500-1 may attempt to establish contact with the anchor UEs from the list received from the network entity. The target UE 500-1 may be requested to contact the candidate anchor UEs to determine if they are available for positioning reference signal exchange with the target UE 500-1. For example, as illustrated with dotted lines at stage 1230, the target UE 500-1 may contact the possible anchor UEs 500-2 and 500-3. The target UE 500-1 for example, may send an availability request to each UE 500-2 and 500-3 to determine their availability for a positioning reference signal exchange with the target UE 500-1 over a sidelink channel.

At block 783, the target UE 500-1 may revise its candidate list of anchor UEs based on the list of possible anchor UEs received from the network entity, and in some implementations, based on contact established in block 782 (if performed). For example, the target UE 500-1 may compare the received list of candidate anchor UEs to its own list candidate anchor UEs and generate a revised list of anchor UEs based on common candidate anchor UEs. In another implementation, instead of revising a previously generated list (e.g., from block 761), the target UE 500-1 may generate the list of candidate list of anchor UEs based on the list of possible anchor UEs received from the network entity, and in some implementations, based on contact established in block 782 (if performed). The target UE 500-1 may provide a recommendation of anchor UEs to the network entity based on the resulting list of candidate anchor UEs. For example, at stage 1232, the target UE 500-1 revises or generates a candidate list of anchor UEs and is provided to the server 400 as a recommendation at stage 1230.

At block 784, the server 400 may generate and send a PRS configuration for one or more anchor UEs to the target UE 500-1 based on the recommendation received from the target UE 500-1. In one implementation, the flow 760 may proceed to block 720 in FIG. 7A, where the network entity may generate and send to the target UE 500-1 a UE-UE PRS configuration for anchor UEs.

Within arm 790, at block 791, the target UE 500-1 may receive from a network entity UE-UE PRS configurations for anchor UEs, i.e., as discussed in FIGS. 7A and 8-11. At block 792, the target UE 500-1 may measure the UE-UE PRS and determine that the PRS measurements are inadequate for positioning of the target UE 500-1, e.g., a characteristic of the PRS measurement is below a threshold. For example, as illustrated at stage 1242, the target UE 500-1 may measure UE-UE PRS based on received UE-UE PRS configuration and determine that the measured PRS are inadequate, e.g., as discussed at stage 1335 below. The target UE 500-1, for example, may determine that the measured PRS is inadequate if the signal-and-interference-to-noise ratio (SINR) is below an acceptable threshold SINR, or if the PRS measurements have a confidence level below an acceptable threshold. Other methods of determining that the measured PRS is inadequate may be used.

At block 793, the target UE 500-1 may provide a recommendation for anchor UEs to the network entity, e.g., the candidate list of anchor UEs, if the measured PRS are inadequate. For example, at stage 1240, the target UE 500-1 provides the recommendation of anchor UEs to the server 400 (or TRP 300-1) in response to determining the measured PRS is inadequate. The UE may send the recommendation of anchor UEs to the network entity, e.g., via a Physical Uplink Common Channel (PUSCH) (Uplink Control Information (UCI)), or Physical Uplink Shared Channel (PUSCH) (UCI, MAC Control Element (MAC-CE), or Radio Resource Control (RRC)) or Long Term Evolution (LTE) Positioning Protocol (LPP) message.

At block 794, the server 400 may revise and send a PRS configuration for one or more anchor UEs to the target UE 500-1 based on the recommendation received from the target UE 500-1. For example, the server 400 may compare the received list of candidate anchor UEs to the anchor UEs from the previously sent list and generate the PRS configuration for one or more anchor UEs based on common candidate anchor UEs. In another example, the server 400 may confirm whether any of the recommended anchor UEs are suitable and may generate the PRS configuration for one or more anchor UEs accordingly. The flow 760, for example, may proceed to block 720 in FIG. 7A, where the network entity may generate and send to the target UE 500-1 a new UE-UE PRS configuration for anchor UEs.

Figure 13:
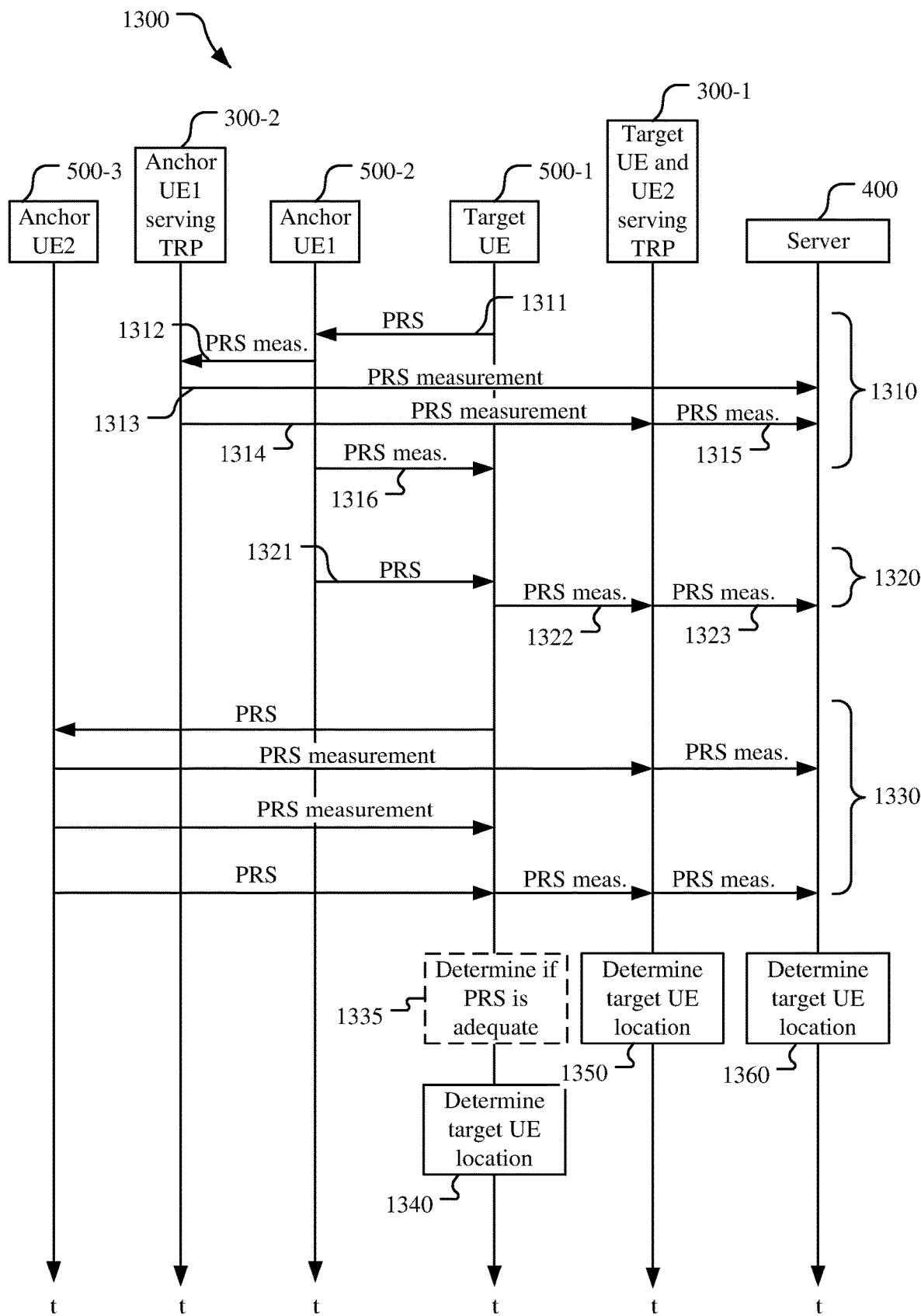
FIG. 13 is a signaling and process flow of UE-UE PRS exchange and UE location determination.

FIG. 13, with further reference to FIGS. 1-11, illustrates a signaling and process flow 1300 for UE-UE PRS exchange and location determination includes the stages shown. The UE-UE PRS exchange includes sending and receiving/measuring one or more PRS. The signaling and process flow 1300 is an example only, as stages may be added, rearranged, and/or removed.

At stage 1310, a PRS from the target UE 500-1 is measured and reported. The target UE 500-1 may send a PRS in a PRS message 1311 to the anchor UE 500-2, and the anchor UE 500-2 may measure the PRS and report the measurement to the TRP 300-2, that serves the anchor UE 500-2, in a PRS measurement message 1312. The PRS in the PRS message 1311 may be sent over a sidelink channel, an uplink channel, or a downlink channel depending on the capabilities of the target UE 500-1 and the anchor UE 500-1, which are taken into account in the selection of the anchor UE 500-2 and the determination and assignment of the PRS configuration to the anchor UE 500-2 and the target UE 500-1. A sidelink channel PRS may have a format of UL-PRS or DL-PRS or another format. The anchor UE 500-2 may send the PRS measurement in a PRS measurement message 1313 to the server 400. The anchor UE 500-2 may open a PRS session with the server 400 for measurement relay only. The anchor UE 500-2 may send the PRS measurement in a PRS measurement message 1314 to the TRP 300-1, serving the target UE 500-2, that sends the PRS measurement in a PRS measurement message 1315 to the server 400. The anchor UE 500-2 may also or alternatively send the PRS measurement to the target UE 500-1 in a PRS measurement message 1316.

At stage 1320, a PRS from the anchor UE 500-2 is measured and reported. The anchor UE 500-2 may send a PRS signal 1321 to the target UE 500-1, and the target UE 500-1 may measure the PRS and report the measurement to the TRP 300-1, that serves the target UE 500-1, in a PRS measurement message 1322, and/or may report the measurement to another TRP, e.g., depending on link quality (e.g., if the communication link to the TRP 300-1 is poor or non-existent). The PRS signal 1321 may be sent over a sidelink channel, an uplink channel, or a downlink channel. The TRP 300-1 may send the PRS measurement to the server 400 in a PRS message 1323. In some implementations, the measurement flow shown in stage 1310 may follow PRS signal 1321, e.g., for RTT positioning.

At stage 1330, PRS may be exchanged, measured, and reported similar to stages 1310 and 1320. At stage 1330, PRS may be sent from the target UE 500-1 to the anchor UE 500-3, that has the same serving TRP as the target UE 500-1, and/or PRS may be sent from the anchor UE 500-3 to the target UE 500-1. The PRS may be measured and reported to the server 400 and/or to the target UE 500-1.

At stage 1335, the target UE 500-1 may optionally determine if the measured UE-UE PRS is adequate, e.g., for position determination, based on a comparison of a characteristic of the PRS measurement to a threshold. For example, the target UE 500-1 the PRS measurements are inadequate if the signal-and-interference-to-noise ratio (SINR) of the measured PRS is below an acceptable threshold SINR or if the PRS measurements have a confidence level that is below an acceptable threshold. Other methods of determining that the measured PRS is inadequate may be used. If the PRS measurements are inadequate, the signaling and process flow 1300 may proceed to block 793. If the PRS measurements are adequate, the signaling and process flow 1300 may proceed to stage 1340.

At stages 1340, 1350, 1360, the location of the target UE 500-1 may be determined, e.g., using one or more positioning techniques discussed above based on one or more PRS measurements. The stages 1340, 1350, 1360 may be performed at different times, and one or more of the stages 1340, 1350, 1360 may be omitted from the signaling and process flow 1300. Stage 1340 is for UE-based positioning and stages 1350, 1360 are for UE-assisted positioning. The TRP 300-1 may have an LMF to determine the location of the target UE 500-1 as stage 1350. The target UE 500-1 may provide a location report to the server 400 or TRP 300-1 with location information. For example, for UE-assisted positioning, the target UE 500-1 may provide a location report with location information that includes the one or more PRS measurements. For UE-based positioning, the target UE 500-1 may provide a location report with location information that includes an estimated location and, in some implementations, the PRS measurements so that the LMF may verify the estimated location.

Figure 14:
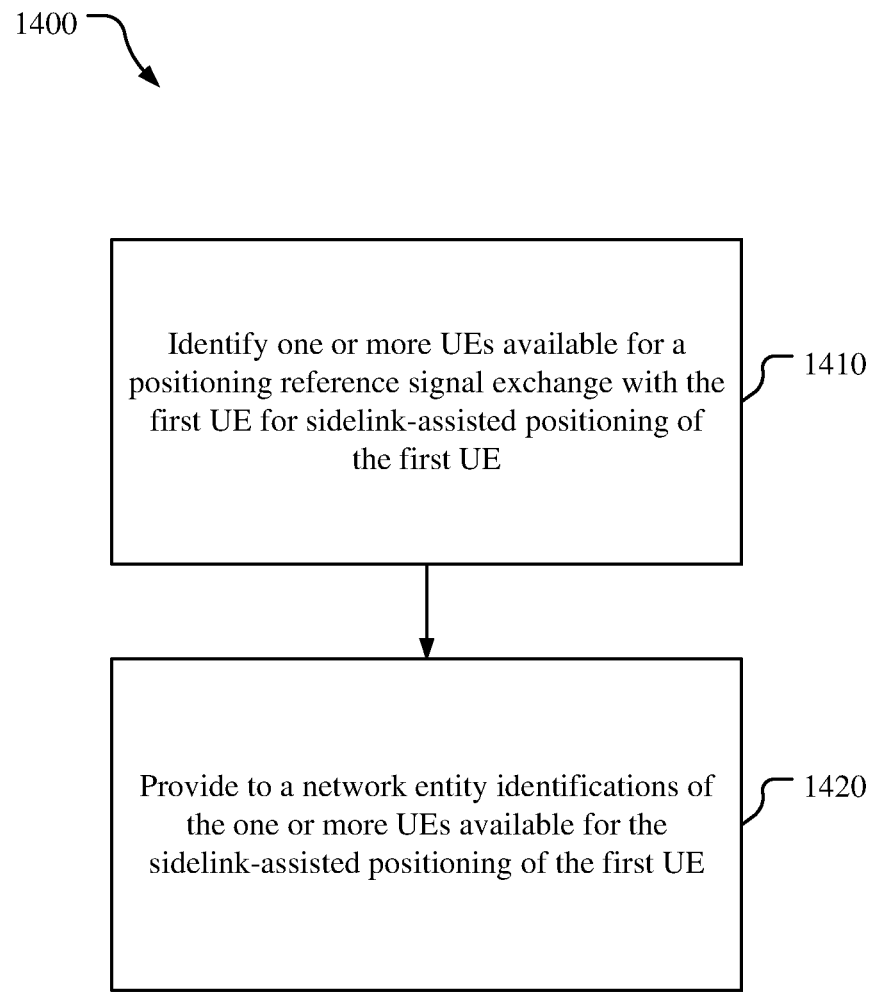
FIGS. 14 and 15 are block flow diagrams of methods of initiating positioning reference signal exchange.

FIG. 14, with further reference to FIGS. 1-13, illustrates a method 1400 of initiating positioning reference signal exchange performed by a first user equipment (UE), such as target UE 500-1. The method 1400 is, however, an example only and not limiting. The method 1400 may be altered, e.g., by having stages added, removed, rearranged, combined, performed concurrently, and/or having single stages split into multiple stages.

At stage 1410, the method 1400 includes identifying one or more UEs available for a positioning reference signal exchange with the first UE for sidelink-assisted positioning of the first UE, for example, as discussed at block 761 in FIG. 7B and stage 1212 of FIG. 12. For example, the target UE 500-1 may monitor transmissions from UEs 500-2 and 500-3 or may contact the UEs 500-2 and 500-3 to determine if they are suitable for sidelink-assisted positioning of the target UE 500-1. The target UE 500-1, for example, may send an availability request to each UE 500-2 and 500-3 to determine their availability for a positioning reference signal exchange with the target UE 500-1 over a sidelink channel and/or may negotiate the capability of the other UEs 500-2 and 500-3, such as whether they support sidelink PRS, their power levels, etc. The target UE 500-1 may receive location information or otherwise exchange signaling that may be used to determine range or location information or characteristics of transmissions from the UEs 500-2 and 500-3. For example, in one implementation, the target UE 500-1 may identify the one or more UEs available for the positioning reference signal exchange with the first UE for the sidelink-assisted positioning of the first UE by sending an availability request to each UE on the candidate list of UEs to request availability of each UE for the positioning reference signal exchange with the first UE over a sidelink channel In one implementation, the target UE 500-1 may identify the one or more UEs available for the positioning reference signal exchange with the first UE for the sidelink-assisted positioning of the first UE is based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof. The processor 510, the interface 520 (e.g., the wireless receiver 244 and the antenna 246), and the memory 530 may comprise means for identifying one or more UEs available for a positioning reference signal exchange with the first UE for sidelink-assisted positioning of the first UE.

At stage 1420, the method 1400 includes providing to a network entity identifications of the one or more UEs available for the sidelink-assisted positioning of the first UE, for example, as discussed at blocks 772, 783, and 793 in FIG. 7B and stages 1220, 1230, and 1240 of FIG. 12. The processor 510, the interface 520 (e.g., the wireless receiver 244 and the antenna 246), and the memory 530 may comprise means for providing to a network entity identifications of the one or more UEs available for the sidelink-assisted positioning of the first UE.

Figure 8:
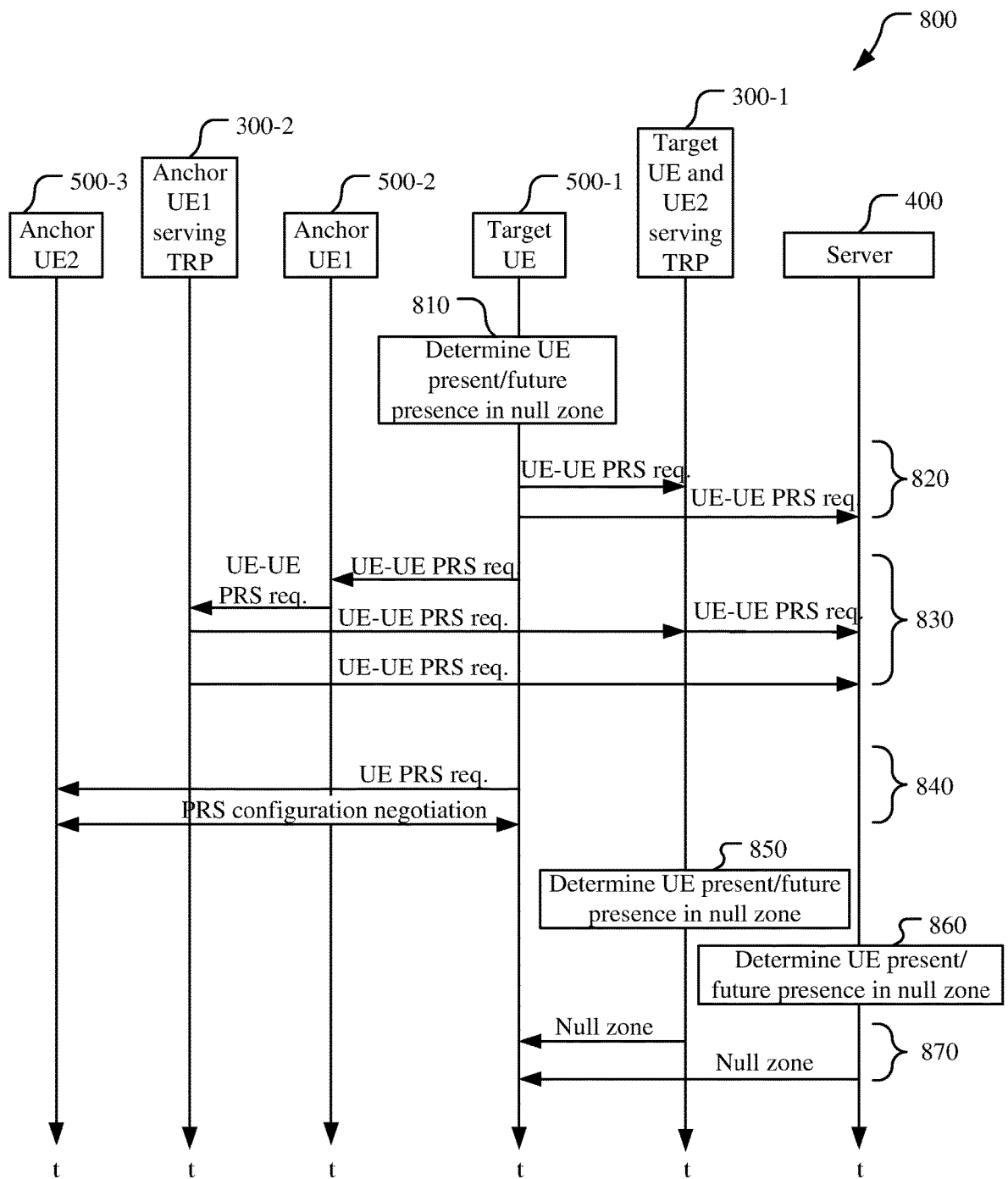
FIG. 8 is a signaling and process flow for requesting UE-UE PRS exchange.

In some implementations, the method 1400 may further include determining a null-zone presence of the first UE being at least one of a current presence of the first UE in a null zone or a future presence of the first UE in the null zone, wherein the one or more UEs are available for sidelink-assisted positioning for the first UE during the null-zone presence of the first UE, e.g., as discussed at block 710 of FIG. 7A and stage 810 of FIG. 8. For example, the target UE 500-1 may determine that the target UE 500-1 is or will be in the null zone 640. The UE 500-1 may determine the (current or future) null zone presence by analyzing positioning measurements to detect an anomaly, e.g., an outlier measurement or calculated position such that there is a change in positioning information of more than a threshold amount. Alternatively, the UE 500-1 may determine presence in the null zone 640 by determining location, e.g., by dead reckoning, and comparing the determined location with a boundary of the null zone 640. Alternatively, the UE 500-1 may determine future null zone presence based on a location estimate for the UE 500-1, motion information regarding the UE 500-1 (e.g., velocity, trajectory), and a boundary of the null zone 640. The UE 500-1 may use this information to calculate future potential locations and determining whether any of those locations are inside the boundary of the null zone 640. Alternatively, the UE 500-1 may determine null zone presence by receiving an indication of null zone presence from another entity, e.g., the server 400. The other entity may determine null zone presence of the UE 500-1 in similar manners as the UE 500-1. Thus, either the UE 500-1 or a network entity may initiate UE-UE positioning. The processor 510, the interface 520 (e.g., the wireless receiver 244 and the antenna 246), and the memory 530 may comprise a means for determining a null-zone presence of the first UE.

In some implementations, the method 1400 may further include receiving from the network entity a request for identification of candidate UEs for the sidelink-assisted positioning for the first UE, wherein the identifications of the one or more UEs available for the sidelink-assisted positioning for the first UE are provided to the network entity in response to the request, e.g., as discussed in arm 770 and blocks 771 and 772 of FIG. 7B, and stage 1220 of FIG. 12. The processor 510, the interface 520 (e.g., the wireless receiver 244 and the antenna 246), and the memory 530 may comprise a means for receiving from the network entity a request for identification of candidate UEs for the sidelink-assisted positioning for the first UE.

In some implementations, the method 1400 may further include receiving from the network entity a candidate list of UEs for the sidelink-assisted positioning for the first UE, wherein identifying the one or more UEs available for the positioning reference signal exchange with the first UE for the sidelink-assisted positioning of the first UE is at least partly based on the candidate list of the UEs; and wherein the identifications of the one or more UEs available for the sidelink-assisted positioning for the first UE are provided to the network entity in response to receiving the candidate list of UEs, e.g., as discussed at arm 780 and blocks 781, 783, and 784 of FIG. 7B, and stage 1230 of FIG. 8. The processor 510, the interface 520 (e.g., the wireless receiver 244 and the antenna 246), and the memory 530 may comprise a means for receiving from the network entity a candidate list of UEs for the sidelink-assisted positioning for the first UE. In one example, the method 1400 may include generating a preliminary list of UEs available for the positioning reference signal exchange with the first UE for the sidelink-assisted positioning of the first UE, wherein identifying the one or more UEs available for the positioning reference signal exchange with the first UE for the sidelink-assisted positioning of the first UE is further based on the preliminary list of UEs for the sidelink-assisted positioning for the first UE, e.g., as discussed at blocks 761 and 783 of FIG. 7B, and stage 1230 of FIG. 8. The processor 510, the interface 520 (e.g., the wireless receiver 244 and the antenna 246), and the memory 530 may comprise a means for generating a preliminary list of UEs available for the positioning reference signal exchange with the first UE for the sidelink-assisted positioning of the first UE. In one example, the method 1400 may further include sending an availability request to each UE on the candidate list of UEs to request availability of each UE for positioning reference signal exchange with the first UE over a sidelink channel, and receiving one or more responses to the availability request to each UE on the candidate list of UEs, wherein identifying the one or more UEs available for the positioning reference signal exchange with the first UE for the sidelink-assisted positioning of the first UE is at least partly based on the one or more responses to the availability request to each UE on the candidate list of UEs, e.g., as discussed at blocks 761, 782, and 783 of FIG. 7B, and stage 1210 of FIG. 8. The processor 510, the interface 520 (e.g., the wireless receiver 244 and the antenna 246), and the memory 530 may comprise a means for sending an availability request to each UE on the candidate list of UEs and a means for receiving one or more responses to the availability request to each UE on the candidate list of UEs.

Figure 9:
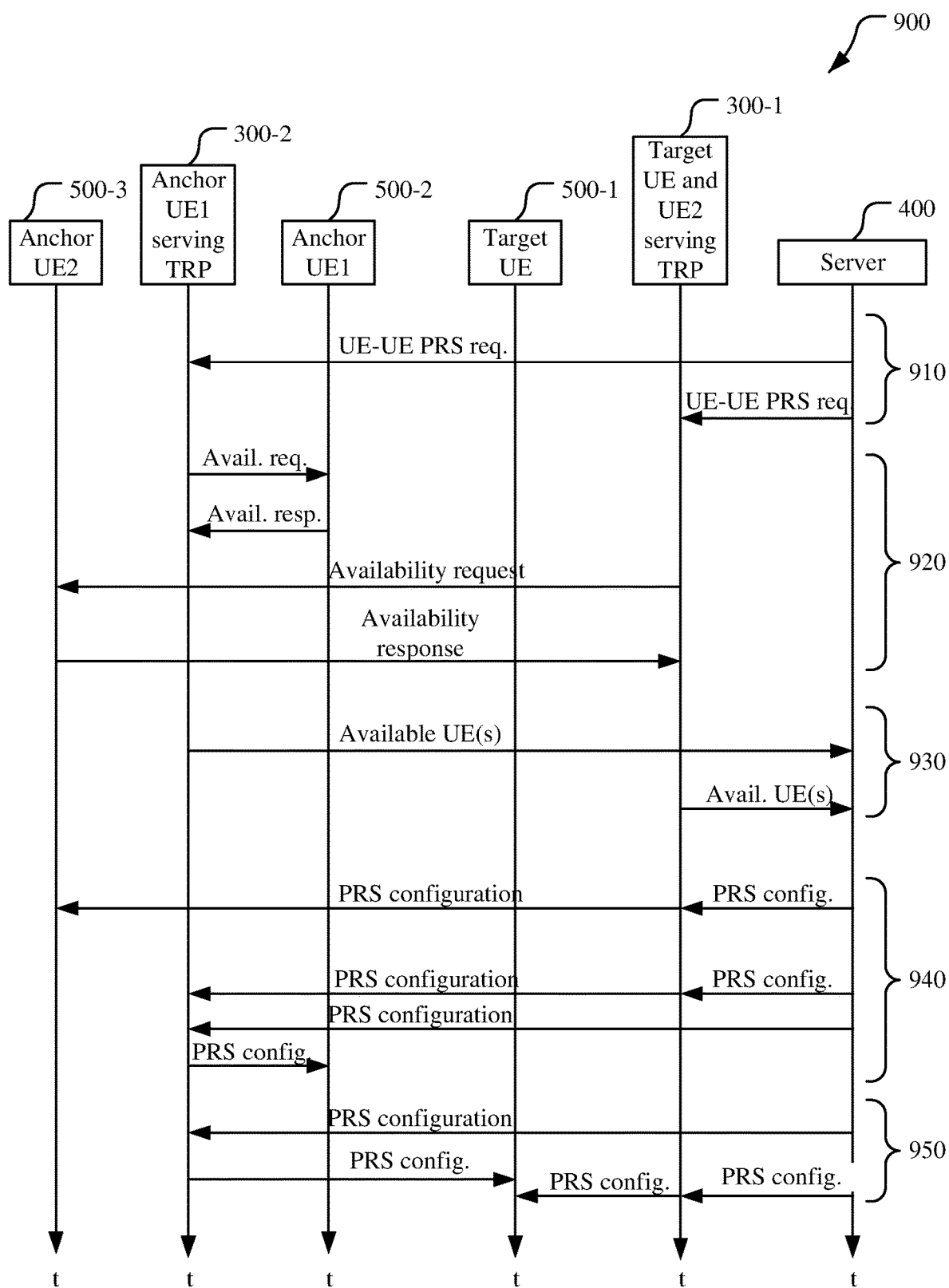
FIG. 9 is a signaling and process flow for LMF-initiated obtaining of PRS configuration for UE-UE PRS exchange.
Figure 10:
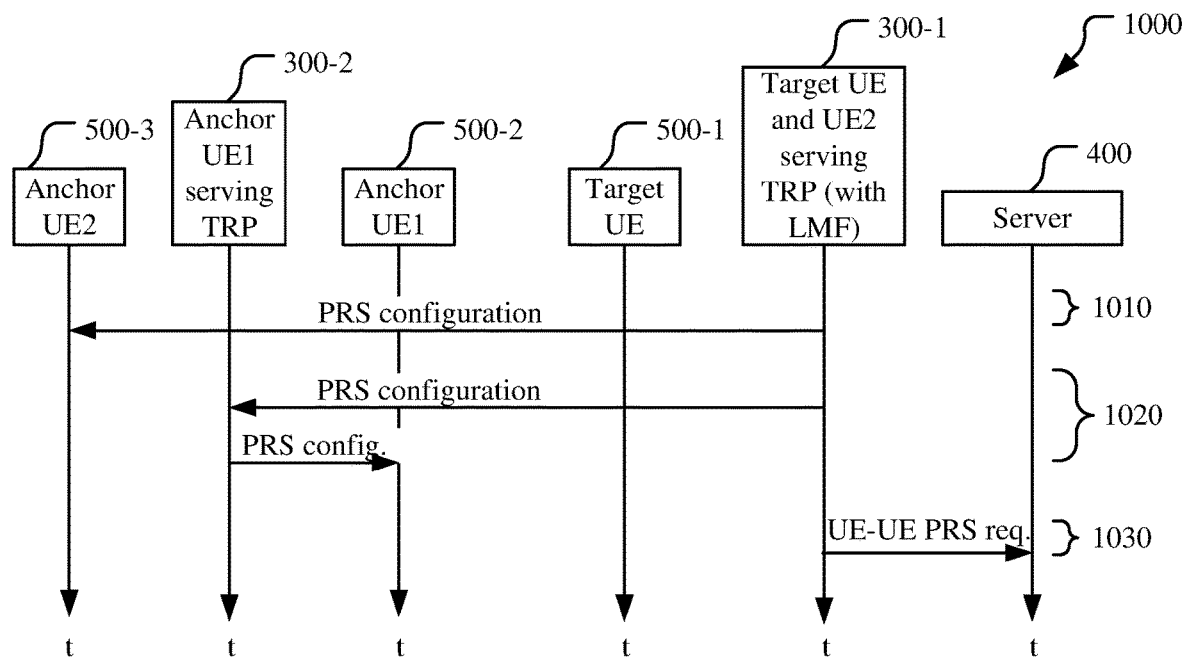
FIGS. 10 and 11 are signaling and process flows for TRP-initiated obtaining of PRS configuration for UE-UE PRS exchange.
Figure 11:
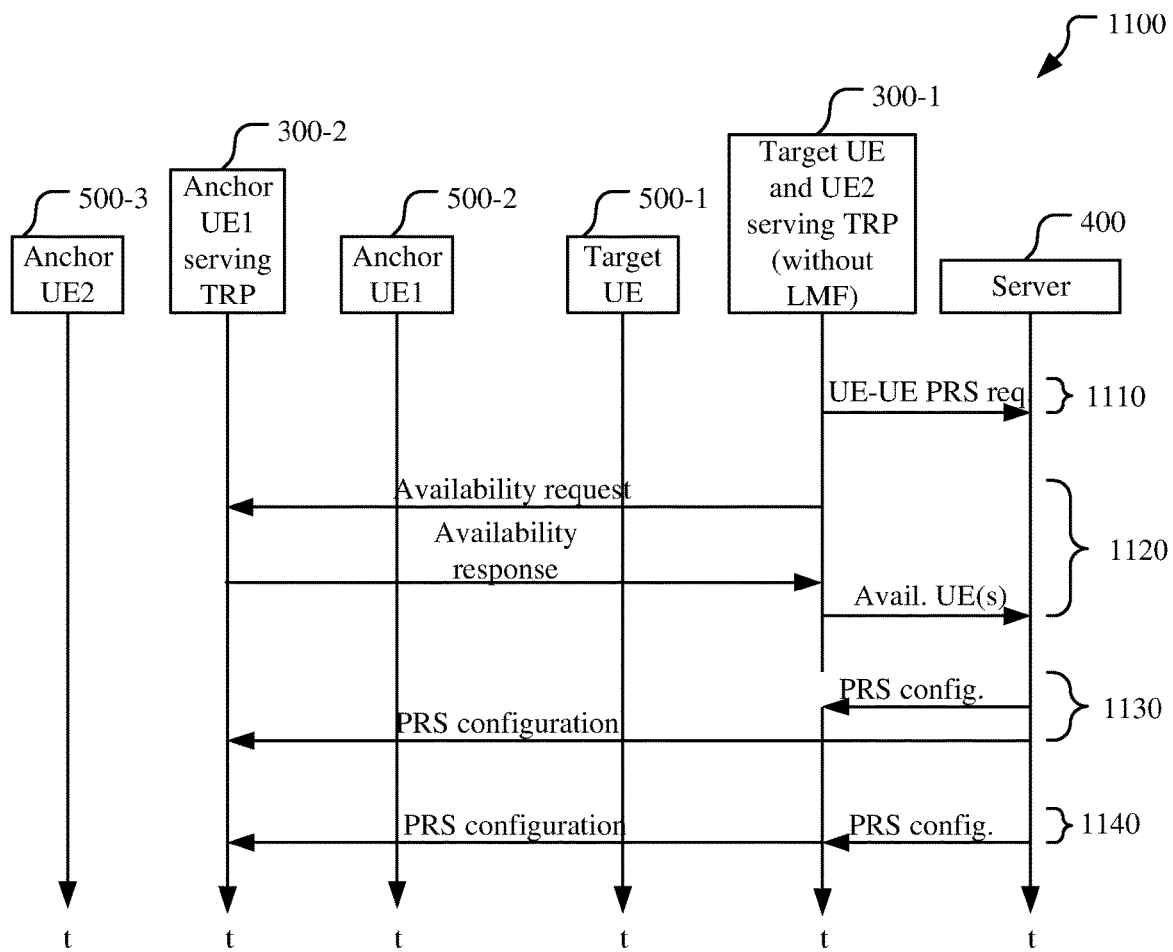

In some implementations, the method 1400 may further include receiving a positioning reference signal configuration for at least one UE for sidelink-assisted positioning for the first UE, e.g., as discussed at arm 790 and block 791 of FIG. 7B, stage 950 of FIG. 9, and stage 1240 of FIG. 12. The processor 510, the interface 520 (e.g., the wireless receiver 244 and the antenna 246), and the memory 530 may comprise a means for sending an availability request to each UE on the candidate list of UEs and a means for receiving a positioning reference signal configuration. The method 1400 may further include generating a positioning reference signal measurement for the at least one UE, e.g., as discussed at arm 790 and block 792 of FIG. 7B, and stage 1240 of FIG. 12, and stage 1320 of FIG. 13. The processor 510, the interface 520 (e.g., the wireless receiver 244 and the antenna 246), and the memory 530 may comprise a means for generating a positioning reference signal measurement for the at least one UE. The method 1400 may further include determining a characteristic of the positioning reference signal measurement for the at least one UE is less than a threshold, wherein the identifications of the one or more UEs available for the positioning reference signal exchange with the first UE for the sidelink-assisted positioning of the first UE are provided to the network entity in response to determining the characteristic of the positioning reference signal measurement for the at least one UE is less than the threshold, e.g., as discussed at arm 790 and blocks 792 and 793 of FIG. 7B, and stage 1240 of FIG. 12, and stage 1335 of FIG. 13. The processor 510, the interface 520 (e.g., the wireless receiver 244 and the antenna 246), and the memory 530 may comprise a means for determining a characteristic of the positioning reference signal measurement for the at least one UE is less than a threshold.

In one implementation, the method 1400 may include receiving from a location server a positioning reference signal configuration for at least one UE in response to providing the identifications of the one or more UEs available for the sidelink-assisted positioning for the first UE, e.g., as discussed at block 732, 740, and 750 of FIG. 7A, and stage 950 of FIG. 9. The processor 510, the interface 520 (e.g., the wireless receiver 244 and the antenna 246), and the memory 530 may comprise a means for receiving from a location server a positioning reference signal configuration for at least one UE. The method 1400 may further include generating a positioning reference signal measurement for the at least one UE, e.g., as discussed in reference to PRS signal 1321 of FIG. 13. The processor 510, the interface 520 (e.g., the wireless receiver 244 and the antenna 246), and the memory 530 may comprise a means for generating a positioning reference signal measurement for the at least one UE. The method 1400 may further include providing a location report to the location server based on the positioning reference signal measurement, e.g., as discussed in reference to stages 1340, 1350, and 1360 of FIG. 13. The processor 510, the interface 520 (e.g., the wireless receiver 244 and the antenna 246), and the memory 530 may comprise a means for providing a location report to the location server based on the positioning reference signal measurement.

Figure 15:
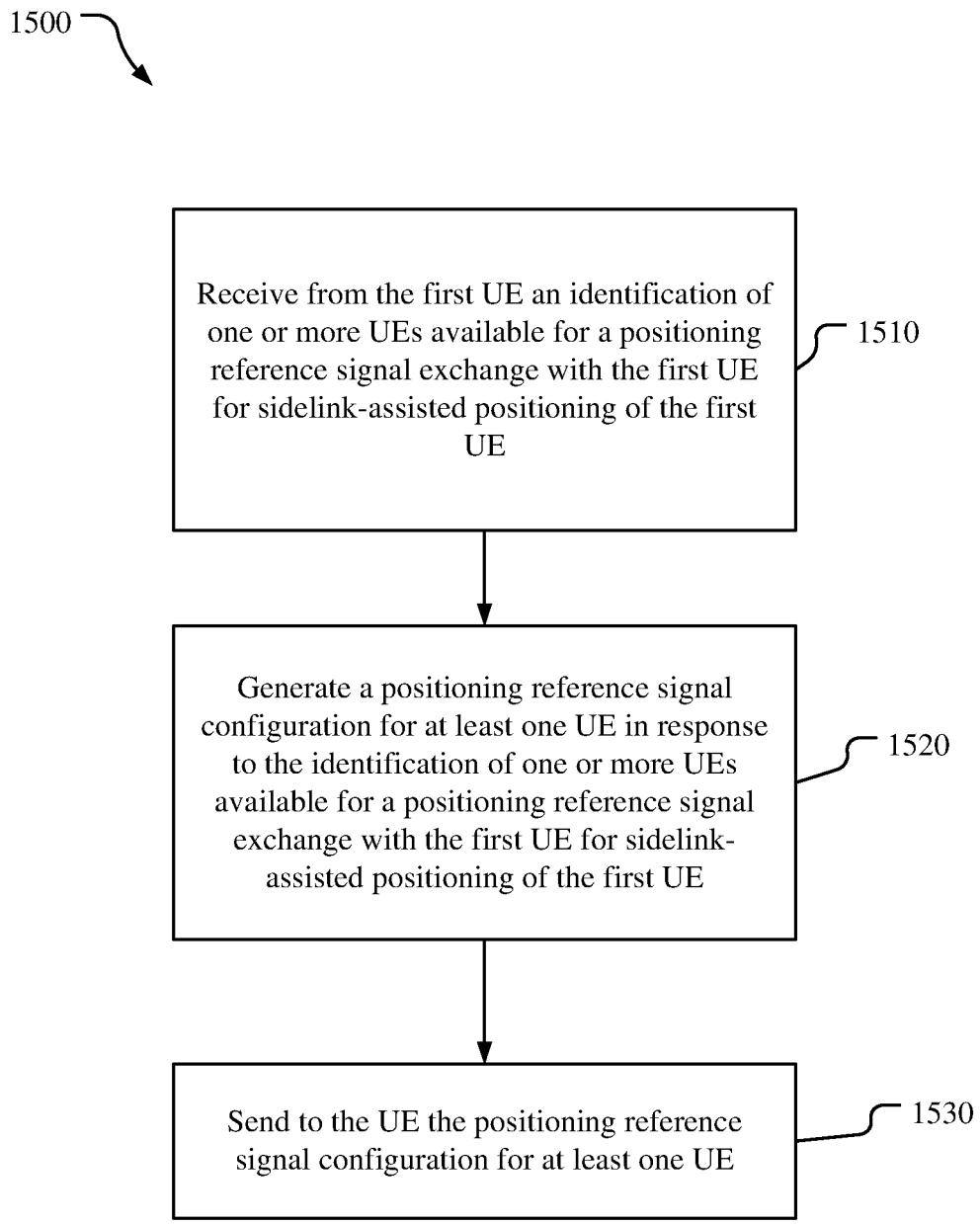

FIG. 15, with further reference to FIGS. 1-14, illustrates a method 1500 of initiating positioning reference signal exchange for a first user equipment (UE) performed by a network entity, such as server 400 or TRP 300-1. The method 1500 is, however, an example only and not limiting. The method 1500 may be altered, e.g., by having stages added, removed, rearranged, combined, performed concurrently, and/or having single stages split into multiple stages.

At stage 1510, the method 1500 includes receiving from the first UE an identification of one or more UEs available for a positioning reference signal exchange with the first UE for sidelink-assisted positioning of the first UE, as discussed at blocks 772, 783, and 793 in FIG. 7B and stages 1220, 1230, and 1240 of FIG. 12. The processor 410, the bus 420 (e.g., the wireless receiver 444 and the antenna 446), and the memory 411 may comprise means for receiving from the first UE an identification of one or more UEs available for a positioning reference signal exchange with the first UE for sidelink-assisted positioning of the first UE. Also or alternatively, the processor 310, the bus 320 (e.g., the wireless receiver 344 and the antenna 346), and the memory 311 may comprise means for receiving from the first UE an identification of one or more UEs available for a positioning reference signal exchange with the first UE for sidelink-assisted positioning of the first UE.

At block 1520, the method 1500 may include generating a positioning reference signal configuration for at least one UE in response to the identification of one or more UEs available for a positioning reference signal exchange with the first UE for sidelink-assisted positioning of the first UE, e.g., as discussed at blocks 773, 784, and 794 of FIG. 7B and blocks 730, 731, 740, and 750 of FIG. 7A. The processor 410, the bus 420 (e.g., the wireless receiver 444 and the antenna 446), and the memory 411 may comprise means for generating a positioning reference signal configuration for at least one UE. Also or alternatively, the processor 310, the bus 320 (e.g., the wireless receiver 344 and the antenna 346), and the memory 311 may comprise means for generating a positioning reference signal configuration for at least one UE.

At block 1530, the method 1500 may include sending to the UE the positioning reference signal configuration for at least one UE, e.g., as discussed at blocks 773, 784, and 794 of FIG. 7B and blocks 732, 740, and 750 of FIG. 7A, and stage 950 of FIG. 9. The processor 410, the bus 420 (e.g., the wireless receiver 444 and the antenna 446), and the memory 411 may comprise means for sending to the UE the positioning reference signal configuration. Also or alternatively, the processor 310, the bus 320 (e.g., the wireless receiver 344 and the antenna 346), and the memory 311 may comprise means for sending to the UE the positioning reference signal configuration.

In one implementation, the method 1500 may include determining a null-zone presence of the first UE being at least one of a current presence of the first UE in a null zone or a future presence of the first UE in the null zone; wherein the at least one UE is available for sidelink-assisted positioning for the first UE during the null-zone presence of the first UE., e.g., as discussed at block 710 of FIG. 7A and stage 810 of FIG. 8. For example, the server 400 (or the TRP 300, e.g., including an LMF) may determine null zone presence of the target UE 500-1, e.g., as discussed above with respect to stage 1310. The processor 410, the bus 420 (e.g., the wireless receiver 444 and the antenna 446), and the memory 411 may comprise means for determining a null-zone presence of the first UE. Also or alternatively, the processor 310, the bus 320 (e.g., the wireless receiver 344 and the antenna 346), and the memory 311 may comprise means for determining a null-zone presence of the first UE.

In one implementation of method 1500, the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof, as discussed at block 761 in FIG. 7B and stage 1212 of FIG. 12.

In one implementation, the method 1500 may further include sending to the first UE a request for identification of candidate UEs for the sidelink-assisted positioning for the first UE, wherein the identifications of the one or more UEs available for the sidelink-assisted positioning for the first UE are received from the first UE in response to the request, e.g., as discussed in arm 770 and blocks 771 and 772 of FIG. 7B, and stage 1220 of FIG. 12. The processor 410, the bus 420 (e.g., the wireless receiver 444 and the antenna 446), and the memory 411 may comprise means for sending to the first UE a request for identification of candidate UEs. Also or alternatively, the processor 310, the bus 320 (e.g., the wireless receiver 344 and the antenna 346), and the memory 311 may comprise means for sending to the first UE a request for identification of candidate UEs.

In one implementation, the method 1500 may further include sending to the first UE a candidate list of UEs for the sidelink-assisted positioning for the first UE; wherein the one or more UEs available for the positioning reference signal exchange with the first UE for the sidelink-assisted positioning of the first UE are identified by the first UE at least partly based on the candidate list of the UEs; and wherein the identification of the one or more UEs available for the sidelink-assisted positioning for the first UE are received from the first UE in response to sending to the first UE the candidate list of UEs, e.g., as discussed at arm 780 and blocks 781, 783, and 784 of FIG. 7B, and stage 1230 of FIG. 8. The processor 410, the bus 420 (e.g., the wireless receiver 444 and the antenna 446), and the memory 411 may comprise means for sending to the first UE a candidate list of UEs. Also or alternatively, the processor 310, the bus 320 (e.g., the wireless receiver 344 and the antenna 346), and the memory 311 may comprise means sending to the first UE a candidate list of UEs. For example, in one implementation, the one or more UEs available for the positioning reference signal exchange with the first UE for the sidelink-assisted positioning of the first UE is further based on a preliminary list of UEs generated by the first UE for the sidelink-assisted positioning for the first UE, e.g., as discussed at blocks 761 and 783 of FIG. 7B, and stage 1230 of FIG. 8.

In one implementation, the positioning reference signal configuration for the at least one UE sent to the first UE is a second positioning reference signal configuration for a second set of UEs, and the method 1500 may further include sending to the first UE a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold, e.g., as discussed at arm 790 and block 791 and 792 of FIG. 7B, stage 950 of FIG. 9, and stage 1240 of FIG. 12 and stage 1335 of FIG. 13. The processor 410, the bus 420 (e.g., the wireless receiver 444 and the antenna 446), and the memory 411 may comprise means for sending to the first UE a first positioning reference signal configuration for a first set of UEs. Also or alternatively, the processor 310, the bus 320 (e.g., the wireless receiver 344 and the antenna 346), and the memory 311 may comprise means for sending to the first UE a first positioning reference signal configuration for a first set of UEs. The method may further include receiving from the first UE an indication that the characteristics of the positioning reference signal measurements for the first set of UEs are below the threshold with the identification of the one or more UEs available for the positioning reference signal exchange with the first UE for the sidelink-assisted positioning of the first UE, e.g., as discussed at arm 790 and block 793 of FIG. 7B, and stage 1240 of FIG. 12. The processor 410, the bus 420 (e.g., the wireless receiver 444 and the antenna 446), and the memory 411 may comprise means for receiving from the first UE an indication that the characteristics of the positioning reference signal measurements for the first set of UEs are below the threshold. Also or alternatively, the processor 310, the bus 320 (e.g., the wireless receiver 344 and the antenna 346), and the memory 311 may comprise means for receiving from the first UE an indication that the characteristics of the positioning reference signal measurements for the first set of UEs are below the threshold. The method 1500 may further include producing the second positioning reference signal configuration for the second set of UEs based on the first positioning reference signal configuration for the first set of UEs and the identification of the one or more UEs available for the positioning reference signal exchange with the first UE for the sidelink-assisted positioning of the first UE, e.g., as discussed at arm 790 and block 794 of FIG. 7B, and stage 1240 of FIG. 12. The processor 410, the bus 420 (e.g., the wireless receiver 444 and the antenna 446), and the memory 411 may comprise means for producing the second positioning reference signal configuration for the second set of UEs. Also or alternatively, the processor 310, the bus 320 (e.g., the wireless receiver 344 and the antenna 346), and the memory 311 may comprise means for producing the second positioning reference signal configuration for the second set of UEs.

In one implementation, the method 1500 may further include receiving from the first UE a location report based on positioning reference signal measurements produced based on the positioning reference signal configuration for the at least one UE, e.g., as discussed in reference to stages 1340, 1350, and 1360 of FIG. 13. The processor 410, the bus 420 (e.g., the wireless receiver 444 and the antenna 446), and the memory 411 may comprise means for receiving from the first UE a location report. Also or alternatively, the processor 310, the bus 320 (e.g., the wireless receiver 344 and the antenna 346), and the memory 311 may comprise means for receiving from the first UE a location report. The method 1500 may further include obtaining a location of the first UE based on the location report, e.g., as discussed in reference to stages 1340, 1350, and 1360 of FIG. 13. The processor 410, the bus 420 (e.g., the wireless receiver 444 and the antenna 446), and the memory 411 may comprise means for obtaining a location of the first UE. Also or alternatively, the processor 310, the bus 320 (e.g., the wireless receiver 344 and the antenna 346), and the memory 311 may comprise means for obtaining a location of the first UE.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. A statement that a feature implements, or a statement that a feature may implement, a function includes that the feature may be configured to implement the function (e.g., a statement that an item performs, or a statement that the item may perform, function X includes that the item may be configured to perform function X). Elements discussed may be components of a larger system, wherein other rules may take precedence over or otherwise modify the application of the present disclosure. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation of a processor configured to at least one of A or B means that the processor is configured to A (and may or may not be configured to B) or is configured to B (and may or may not be configured to B) or is configured to A and B, where A is a function (e.g., determine, obtain, or measure, etc.) and B is a function.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

In view of this description embodiments may include different combinations of features. Implementation examples are described in the following numbered clauses:

Clause 1. A method performed by a first user equipment for initiating positioning reference signal exchange, the method comprising: identifying one or more UEs available for a positioning reference signal exchange with the first UE for sidelink-assisted positioning of the first UE; and providing to a network entity identifications of the one or more UEs available for the sidelink-assisted positioning of the first UE.

Clause 2. The method of clause 1, further comprising: determining a null-zone presence of the first UE being at least one of a current presence of the first UE in a null zone or a future presence of the first UE in the null zone; and wherein the one or more UEs are available for the sidelink-assisted positioning for the first UE during the null-zone presence of the first UE.

Clause 3. The method of either of clauses 1 or 2, wherein identifying the one or more UEs available for the positioning reference signal exchange with the first UE for the sidelink-assisted positioning of the first UE is based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 4. The method of any of clauses 1-3, wherein identifying the one or more UEs available for the positioning reference signal exchange with the first UE for the sidelink-assisted positioning of the first UE comprises sending an availability request to each UE on a candidate list of UEs to request availability of each UE for the positioning reference signal exchange with the first UE over a sidelink channel.

Clause 5. The method of any of clauses 1-4, further comprising: receiving from the network entity a request for identification of candidate UEs for the sidelink-assisted positioning for the first UE; wherein the identifications of the one or more UEs available for the sidelink-assisted positioning for the first UE are provided to the network entity in response to the request.

Clause 6. The method of any of clauses 1-5, further comprising: receiving from the network entity a candidate list of UEs for the sidelink-assisted positioning for the first UE; wherein identifying the one or more UEs available for the positioning reference signal exchange with the first UE for the sidelink-assisted positioning of the first UE is at least partly based on the candidate list of the UEs; and wherein the identifications of the one or more UEs available for the sidelink-assisted positioning for the first UE are provided to the network entity in response to receiving the candidate list of UEs.

Clause 7. The method of clause 6, further comprising: generating a preliminary list of UEs available for the positioning reference signal exchange with the first UE for the sidelink-assisted positioning of the first UE; wherein identifying the one or more UEs available for the positioning reference signal exchange with the first UE for the sidelink-assisted positioning of the first UE is further based on the preliminary list of UEs for the sidelink-assisted positioning for the first UE.

Clause 8. The method of either of clauses 6 or 7, further comprising: sending an availability request to each UE on the candidate list of UEs to request availability of each UE for positioning reference signal exchange with the first UE over a sidelink channel; receiving one or more responses to the availability request to each UE on the candidate list of UEs; wherein identifying the one or more UEs available for the positioning reference signal exchange with the first UE for the sidelink-assisted positioning of the first UE is at least partly based on the one or more responses to the availability request to each UE on the candidate list of UEs.

Clause 9. The method of any of clauses 1-8, further comprising: receiving a positioning reference signal configuration for at least one UE for the sidelink-assisted positioning for the first UE; generating a positioning reference signal measurement for the at least one UE; determining a characteristic of the positioning reference signal measurement for the at least one UE is less than a threshold; wherein the identifications of the one or more UEs available for the positioning reference signal exchange with the first UE for the sidelink-assisted positioning of the first UE are provided to the network entity in response to determining the characteristic of the positioning reference signal measurement for the at least one UE is less than the threshold.

Clause 10. The method of any of clauses 1-9, further comprising: receiving from a location server a positioning reference signal configuration for at least one UE in response to providing the identifications of the one or more UEs available for the sidelink-assisted positioning for the first UE; generating a positioning reference signal measurement for the at least one UE; and providing a location report to the location server based on the positioning reference signal measurement.

Clause 11. A first user equipment (UE) configured for initiating positioning reference signal exchange, comprising: a transceiver; a memory; and a processor, communicatively coupled to the transceiver and the memory, and configured to: identify one or more UEs available for a positioning reference signal exchange with the first UE for sidelink-assisted positioning of the first UE; and provide to a network entity, via the transceiver, identifications of the one or more UEs available for the sidelink-assisted positioning of the first UE.

Clause 12. The first UE of clause 11, wherein the processor is further configured to: determine a null-zone presence of the first UE being at least one of a current presence of the first UE in a null zone or a future presence of the first UE in the null zone; and wherein the one or more UEs are available for the sidelink-assisted positioning for the first UE during the null-zone presence of the first UE.

Clause 13. The first UE of either of clauses 11 or 12, wherein the processor is configured to identify the one or more UEs available for the positioning reference signal exchange with the first UE for the sidelink-assisted positioning of the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 14. The first UE of any of clauses 11-13, wherein the processor is configured to identify the one or more UEs available for the positioning reference signal exchange with the first UE for the sidelink-assisted positioning of the first UE by being configured to send an availability request to each UE on a candidate list of UEs to request availability of each UE for the positioning reference signal exchange with the first UE over a sidelink channel.

Clause 15. The first UE of any of clauses 11-14, wherein the processor is further configured to: receive from the network entity, via the transceiver, a request for identification of candidate UEs for the sidelink-assisted positioning for the first UE; wherein the identifications of the one or more UEs available for the sidelink-assisted positioning for the first UE are provided to the network entity in response to the request.

Clause 16. The first UE of any of clauses 11-15, wherein the processor is further configured to: receive from the network entity, via the transceiver, a candidate list of UEs for the sidelink-assisted positioning for the first UE; wherein the processor is configured to identify the one or more UEs available for the positioning reference signal exchange with the first UE for the sidelink-assisted positioning of the first UE at least partly based on the candidate list of the UEs; and wherein the identifications of the one or more UEs available for the sidelink-assisted positioning for the first UE are provided to the network entity in response to receiving the candidate list of UEs.

Clause 17. The first UE of clause 16, wherein the processor is further configured to: generate a preliminary list of UEs available for the positioning reference signal exchange with the first UE for the sidelink-assisted positioning of the first UE; wherein the processor is configured to identify the one or more UEs available for the positioning reference signal exchange with the first UE for the sidelink-assisted positioning of the first UE further based on the preliminary list of UEs for the sidelink-assisted positioning for the first UE.

Clause 18. The first UE of either of clauses 16 or 17, wherein the processor is further configured to: send, via the transceiver, an availability request to each UE on the candidate list of UEs to request availability of each UE for positioning reference signal exchange with the first UE over a sidelink channel; receive, via the transceiver, one or more responses to the availability request to each UE on the candidate list of UEs; wherein the processor is configured to identify the one or more UEs available for the positioning reference signal exchange with the first UE for the sidelink-assisted positioning of the first UE at least partly based on the one or more responses to the availability request to each UE on the candidate list of UEs.

Clause 19. The first UE of any of clauses 11-18, wherein the processor is further configured to: receive, via the transceiver, a positioning reference signal configuration for at least one UE for the sidelink-assisted positioning for the first UE; generate a positioning reference signal measurement for the at least one UE; determine a characteristic of the positioning reference signal measurement for the at least one UE is less than a threshold; wherein the identifications of the one or more UEs available for the positioning reference signal exchange with the first UE for the sidelink-assisted positioning of the first UE are provided to a determination that the characteristic of the positioning reference signal measurement for the at least one UE is less than the threshold.

Clause 20. The first UE of any of clauses 11-19, wherein the processor is further configured to: receive from a location server, via the transceiver, a positioning reference signal configuration for at least one UE in response to providing the identifications of the one or more UEs available for the sidelink-assisted positioning for the first UE; generate a positioning reference signal measurement for the at least one UE; and provide a location report to the location server based on the positioning reference signal measurement.

Clause 21. A first user equipment (UE) configured for initiating positioning reference signal exchange, comprising: means for identifying one or more UEs available for a positioning reference signal exchange with the first UE for sidelink-assisted positioning of the first UE; and means for providing to a network entity identifications of the one or more UEs available for the sidelink-assisted positioning of the first UE.

Clause 22. The first UE of clause 21, further comprising: means for determining a null-zone presence of the first UE being at least one of a current presence of the first UE in a null zone or a future presence of the first UE in the null zone; and wherein the one or more UEs are available for the sidelink-assisted positioning for the first UE during the null-zone presence of the first UE.

Clause 23. The first UE of either of clauses 21 or 22, wherein the means for identifying the one or more UEs available for the positioning reference signal exchange with the first UE for the sidelink-assisted positioning of the first UE is based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 24. The first UE of any of clauses 21-23, wherein the means for identifying the one or more UEs available for the positioning reference signal exchange with the first UE for the sidelink-assisted positioning of the first UE sends an availability request to each UE on a candidate list of UEs to request availability of each UE for the positioning reference signal exchange with the first UE over a sidelink channel.

Clause 25. The first UE of any of clauses 21-24, further comprising: means for receiving from the network entity a request for identification of candidate UEs for the sidelink-assisted positioning for the first UE; wherein the identifications of the one or more UEs available for the sidelink-assisted positioning for the first UE are provided to the network entity in response to the request.

Clause 26. The first UE of any of clauses 21-25, further comprising: means for receiving from the network entity a candidate list of UEs for the sidelink-assisted positioning for the first UE; wherein identifying the one or more UEs available for the positioning reference signal exchange with the first UE for the sidelink-assisted positioning of the first UE is at least partly based on the candidate list of the UEs; and wherein the identifications of the one or more UEs available for the sidelink-assisted positioning for the first UE are provided to the network entity in response to receiving the candidate list of UEs.

Clause 27. The first UE of clause 26, further comprising: means for generating a preliminary list of UEs available for the positioning reference signal exchange with the first UE for the sidelink-assisted positioning of the first UE; wherein identifying the one or more UEs available for the positioning reference signal exchange with the first UE for the sidelink-assisted positioning of the first UE is further based on the preliminary list of UEs for the sidelink-assisted positioning for the first UE.

Clause 28. The first UE of either of clauses 26 or 27, further comprising: means for sending an availability request to each UE on the candidate list of UEs to request availability of each UE for positioning reference signal exchange with the first UE over a sidelink channel; means for receiving one or more responses to the availability request to each UE on the candidate list of UEs; wherein identifying the one or more UEs available for the positioning reference signal exchange with the first UE for the sidelink-assisted positioning of the first UE is at least partly based on the one or more responses to the availability request to each UE on the candidate list of UEs.

Clause 29. The first UE of any of clauses 21-28, further comprising: means for receiving a positioning reference signal configuration for at least one UE for the sidelink-assisted positioning for the first UE; means for generating a positioning reference signal measurement for the at least one UE; means for determining a characteristic of the positioning reference signal measurement for the at least one UE is less than a threshold; wherein the identifications of the one or more UEs available for the positioning reference signal exchange with the first UE for the sidelink-assisted positioning of the first UE are provided to determining the characteristic of the positioning reference signal measurement for the at least one UE is less than the threshold.

Clause 30. The first UE of any of clauses 21-29, further comprising: means for receiving from a location server a positioning reference signal configuration for at least one UE in response to providing the identifications of the one or more UEs available for the sidelink-assisted positioning for the first UE; means for generating a positioning reference signal measurement for the at least one UE; and means for providing a location report to the location server based on the positioning reference signal measurement.

Clause 31. A non-transitory storage medium including program code stored thereon, the program code is operable to configure a processor of a first user equipment (UE) to initiate positioning reference signal exchange, comprising: program code to identify one or more UEs available for a positioning reference signal exchange with the first UE for sidelink-assisted positioning of the first UE; and program code to provide to a network entity identifications of the one or more UEs available for the sidelink-assisted positioning of the first UE.

Clause 32. The non-transitory storage medium of clause 31, further comprising: program code to determine a null-zone presence of the first UE being at least one of a current presence of the first UE in a null zone or a future presence of the first UE in the null zone; and wherein the one or more UEs are available for the sidelink-assisted positioning for the first UE during the null-zone presence of the first UE.

Clause 33. The non-transitory storage medium of either of clauses 31 or 32, wherein the program code to identify the one or more UEs available for the positioning reference signal exchange with the first UE for the sidelink-assisted positioning of the first UE is based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 34. The non-transitory storage medium of any of clauses 31-33, wherein the program code to identify the one or more UEs available for the positioning reference signal exchange with the first UE for the sidelink-assisted positioning of the first UE sends an availability request to each UE on a candidate list of UEs to request availability of each UE for the positioning reference signal exchange with the first UE over a sidelink channel.

Clause 35. The non-transitory storage medium of any of clauses 31-34, further comprising: program code to receive from the network entity a request for identification of candidate UEs for the sidelink-assisted positioning for the first UE; wherein the identifications of the one or more UEs available for the sidelink-assisted positioning for the first UE are provided to the network entity in response to the request.

Clause 36. The non-transitory storage medium of any of clauses 31-35, further comprising: program code to receive from the network entity a candidate list of UEs for the sidelink-assisted positioning for the first UE; wherein the program code to identify the one or more UEs available for the positioning reference signal exchange with the first UE for the sidelink-assisted positioning of the first UE is at least partly based on the candidate list of the UEs; and wherein the identifications of the one or more UEs available for the sidelink-assisted positioning for the first UE are provided to the network entity in response to receiving the candidate list of UEs.

Clause 37. The non-transitory storage medium of clause 36, further comprising: program code to generate a preliminary list of UEs available for the positioning reference signal exchange with the first UE for the sidelink-assisted positioning of the first UE; wherein the program code to identify the one or more UEs available for the positioning reference signal exchange with the first UE for the sidelink-assisted positioning of the first UE is further based on the preliminary list of UEs for the sidelink-assisted positioning for the first UE.

Clause 38. The non-transitory storage medium of either of clauses 36 or 37, further comprising: program code to send an availability request to each UE on the candidate list of UEs to request availability of each UE for positioning reference signal exchange with the first UE over a sidelink channel; program code to receive one or more responses to the availability request to each UE on the candidate list of UEs; wherein the program code to identify the one or more UEs available for the positioning reference signal exchange with the first UE for the sidelink-assisted positioning of the first UE is at least partly based on the one or more responses to the availability request to each UE on the candidate list of UEs.

Clause 39. The non-transitory storage medium of any of clauses 31-38, further comprising: program code to receive a positioning reference signal configuration for at least one UE for the sidelink-assisted positioning for the first UE; program code to generate a positioning reference signal measurement for the at least one UE; program code to determine a characteristic of the positioning reference signal measurement for the at least one UE is less than a threshold; wherein the identifications of the one or more UEs available for the positioning reference signal exchange with the first UE for the sidelink-assisted positioning of the first UE are provided to the network entity in response to determining the characteristic of the positioning reference signal measurement for the at least one UE is less than the threshold.

Clause 40. The non-transitory storage medium of any of clauses 31-39, further comprising: program code to receive from a location server a positioning reference signal configuration for at least one UE in response to providing the identifications of the one or more UEs available for the sidelink-assisted positioning for the first UE; program code to generate a positioning reference signal measurement for the at least one UE; and program code to provide a location report to the location server based on the positioning reference signal measurement.

Clause 41. A method performed by a network entity for initiating positioning reference signal exchange for a first user equipment (UE), the method comprising: receiving from the first UE an identification of one or more UEs available for a positioning reference signal exchange with the first UE for sidelink-assisted positioning of the first UE; generating a positioning reference signal configuration for at least one UE in response to the identification of one or more UEs available for a positioning reference signal exchange with the first UE for the sidelink-assisted positioning of the first UE; and sending to the UE the positioning reference signal configuration for the at least one UE.

Clause 42. The method of clause 41, further comprising: determining a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

Clause 43. The method of either of clauses 41 or 42, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 44. The method of any of clauses 41-43, further comprising: sending to the first UE a request for identification of candidate UEs for the sidelink-assisted positioning for the first UE; wherein the identifications of the one or more UEs available for the sidelink-assisted positioning for the first UE are received from the first UE in response to the request.

Clause 45. The method of any of clauses 41-44, further comprising: sending to the first UE a candidate list of UEs for the sidelink-assisted positioning for the first UE; wherein the one or more UEs available for the positioning reference signal exchange with the first UE for the sidelink-assisted positioning of the first UE are identified by the first UE at least partly based on the candidate list of the UEs; and wherein the identification of the one or more UEs available for the sidelink-assisted positioning for the first UE are received from the first UE in response to sending to the first UE the candidate list of UEs.

Clause 46. The method of clause 45, wherein the one or more UEs available for the positioning reference signal exchange with the first UE for the sidelink-assisted positioning of the first UE is further based on a preliminary list of UEs generated by the first UE for the sidelink-assisted positioning for the first UE.

Clause 47. The method of any of clauses 41-46, wherein the positioning reference signal configuration for the at least one UE sent to the first UE is a second positioning reference signal configuration for a second set of UEs, the method further comprising: sending to the first UE a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold; receiving from the first UE an indication that the characteristics of the positioning reference signal measurements for the first set of UEs are below the threshold with the identification of the one or more UEs available for the positioning reference signal exchange with the first UE for the sidelink-assisted positioning of the first UE; producing the second positioning reference signal configuration for the second set of UEs based on the first positioning reference signal configuration for the first set of UEs and the identification of the one or more UEs available for the positioning reference signal exchange with the first UE for the sidelink-assisted positioning of the first UE.

Clause 48. The method of any of clauses 41-47, further comprising: receiving from the first UE a location report based on positioning reference signal measurements produced based on the positioning reference signal configuration for the at least one UE; and obtaining a location of the first UE based on the location report.

Clause 49. The method of any of clauses 41-48, wherein the network entity is one of a location server and a base station.

Clause 50. A network entity configured to initiate positioning reference signal exchange for a first user equipment (UE), comprising: a transceiver; a memory; and a processor, communicatively coupled to the transceiver and the memory, and configured to: receive from the first UE, via the transceiver, an identification of one or more UEs available for a positioning reference signal exchange with the first UE for sidelink-assisted positioning of the first UE; generate a positioning reference signal configuration for at least one UE in response to the identification of one or more UEs available for a positioning reference signal exchange with the first UE for the sidelink-assisted positioning of the first UE; and send to the UE, via the transceiver, the positioning reference signal configuration for the at least one UE.

Clause 51. The network entity of clause 50, wherein the processor is further configured to: determine a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

Clause 52. The network entity of either of clauses 50 or 51, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 53. The network entity of any of clauses 50-52, wherein the processor is further configured to: send to the first UE, via the transceiver, a request for identification of candidate UEs for the sidelink-assisted positioning for the first UE; wherein the identifications of the one or more UEs available for the sidelink-assisted positioning for the first UE are received from the first UE in response to the request.

Clause 54. The network entity of any of clauses 50-53, wherein the processor is further configured to: send to the first UE, via the transceiver, a candidate list of UEs for the sidelink-assisted positioning for the first UE; wherein the one or more UEs available for the positioning reference signal exchange with the first UE for the sidelink-assisted positioning of the first UE are identified by the first UE at least partly based on the candidate list of the UEs; and wherein the identification of the one or more UEs available for the sidelink-assisted positioning for the first UE are received from the first UE in response to sending to the first UE the candidate list of UEs.

Clause 55. The network entity of clause 54, wherein the one or more UEs available for the positioning reference signal exchange with the first UE for the sidelink-assisted positioning of the first UE is further based on a preliminary list of UEs generated by the first UE for the sidelink-assisted positioning for the first UE.

Clause 56. The network entity of any of clauses 50-55, wherein the positioning reference signal configuration for the at least one UE sent to the first UE is a second positioning reference signal configuration for a second set of UEs, wherein the processor is further configured to: send to the first UE, via the transceiver, a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold; receive from the first UE, via the transceiver, an indication that the characteristics of the positioning reference signal measurements for the first set of UEs are below the threshold with the identification of the one or more UEs available for the positioning reference signal exchange with the first UE for the sidelink-assisted positioning of the first UE; produce the second positioning reference signal configuration for the second set of UEs based on the first positioning reference signal configuration for the first set of UEs and the identification of the one or more UEs available for the positioning reference signal exchange with the first UE for the sidelink-assisted positioning of the first UE.

Clause 57. The network entity of any of clauses 50-56, wherein the processor is further configured to: receive from the first UE, via the transceiver, a location report based on positioning reference signal measurements produced based on the positioning reference signal configuration for the at least one UE; and obtain a location of the first UE based on the location report.

Clause 58. The network entity of any of clauses 50-57, wherein the network entity is one of a location server and a base station.

Clause 59. A network entity configured to initiate positioning reference signal exchange for a first user equipment (UE), comprising: means for receiving from the first UE an identification of one or more UEs available for a positioning reference signal exchange with the first UE for sidelink-assisted positioning of the first UE; means for generating a positioning reference signal configuration for at least one UE in response to the identification of one or more UEs available for a positioning reference signal exchange with the first UE for the sidelink-assisted positioning of the first UE; and means for sending to the UE the positioning reference signal configuration for the at least one UE.

Clause 60. The network entity of clause 59, further comprising: means for determining a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

Clause 61. The network entity of either of clauses 59 or 60, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 62. The network entity of any of clauses 59-61, further comprising: means for sending to the first UE a request for identification of candidate UEs for the sidelink-assisted positioning for the first UE; wherein the identifications of the one or more UEs available for the sidelink-assisted positioning for the first UE are received from the first UE in response to the request.

Clause 63. The network entity of any of clauses 59-62, further comprising: means for sending to the first UE a candidate list of UEs for the sidelink-assisted positioning for the first UE; wherein the one or more UEs available for the positioning reference signal exchange with the first UE for the sidelink-assisted positioning of the first UE are identified by the first UE at least partly based on the candidate list of the UEs; and wherein the identification of the one or more UEs available for the sidelink-assisted positioning for the first UE are received from the first UE in response to sending to the first UE the candidate list of UEs.

Clause 64. The network entity of clause 63, wherein the one or more UEs available for the positioning reference signal exchange with the first UE for the sidelink-assisted positioning of the first UE is further based on a preliminary list of UEs generated by the first UE for the sidelink-assisted positioning for the first UE.

Clause 65. The network entity of any of clauses 59-64, wherein the positioning reference signal configuration for the at least one UE sent to the first UE is a second positioning reference signal configuration for a second set of UEs, the method further comprising: means for sending to the first UE a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold; means for receiving from the first UE an indication that the characteristics of the positioning reference signal measurements for the first set of UEs are below the threshold with the identification of the one or more UEs available for the positioning reference signal exchange with the first UE for the sidelink-assisted positioning of the first UE; means for producing the second positioning reference signal configuration for the second set of UEs based on the first positioning reference signal configuration for the first set of UEs and the identification of the one or more UEs available for the positioning reference signal exchange with the first UE for the sidelink-assisted positioning of the first UE.

Clause 66. The network entity of any of clauses 59-65, further comprising: means for receiving from the first UE a location report based on positioning reference signal measurements produced based on the positioning reference signal configuration for the at least one UE; and means for obtaining a location of the first UE based on the location report.

Clause 67. The network entity of any of clauses 59-66, wherein the network entity is one of a location server and a base station.

Clause 68. A non-transitory storage medium including program code stored thereon, the program code is operable to configure a processor of a network entity configured to initiate positioning reference signal exchange for a first user equipment (UE), comprising: program code to receive from the first UE an identification of one or more UEs available for a positioning reference signal exchange with the first UE for sidelink-assisted positioning of the first UE; program code to generate a positioning reference signal configuration for at least one UE in response to the identification of one or more UEs available for a positioning reference signal exchange with the first UE for the sidelink-assisted positioning of the first UE; and program code to send to the UE the positioning reference signal configuration for the at least one UE.

Clause 69. The non-transitory storage medium of clause 68, further comprising: program code to determine a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

Clause 70. The non-transitory storage medium of either of clauses 68 or 69, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

Clause 71. The non-transitory storage medium of any of clauses 68-70, further comprising: program code to send to the first UE a request for identification of candidate UEs for the sidelink-assisted positioning for the first UE; wherein the identifications of the one or more UEs available for the sidelink-assisted positioning for the first UE are received from the first UE in response to the request.

Clause 72. The non-transitory storage medium of any of clauses 68-71, further comprising: program code to send to the first UE a candidate list of UEs for the sidelink-assisted positioning for the first UE; wherein the one or more UEs available for the positioning reference signal exchange with the first UE for the sidelink-assisted positioning of the first UE are identified by the first UE at least partly based on the candidate list of the UEs; and wherein the identification of the one or more UEs available for the sidelink-assisted positioning for the first UE are received from the first UE in response to sending to the first UE the candidate list of UEs.

Clause 73. The non-transitory storage medium of clause 72, wherein the one or more UEs available for the positioning reference signal exchange with the first UE for the sidelink-assisted positioning of the first UE is further based on a preliminary list of UEs generated by the first UE for the sidelink-assisted positioning for the first UE.

Clause 74. The non-transitory storage medium of any of clauses 68-73, wherein the positioning reference signal configuration for the at least one UE sent to the first UE is a second positioning reference signal configuration for a second set of UEs, the method further comprising: program code to send to the first UE, via the transceiver, a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold; program code to receive from the first UE, via the transceiver, an indication that the characteristics of the positioning reference signal measurements for the first set of UEs are below the threshold with the identification of the one or more UEs available for the positioning reference signal exchange with the first UE for the sidelink-assisted positioning of the first UE; program code to produce the second positioning reference signal configuration for the second set of UEs based on the first positioning reference signal configuration for the first set of UEs and the identification of the one or more UEs available for the positioning reference signal exchange with the first UE for the sidelink-assisted positioning of the first UE.

Clause 75. The non-transitory storage medium of any of clauses 68-74, further comprising: program code to receive from the first UE a location report based on positioning reference signal measurements produced based on the positioning reference signal configuration for the at least one UE; and program code to obtain a location of the first UE based on the location report.

Clause 76. The non-transitory storage medium of any of clauses 68-75, wherein the network entity is one of a location server and a base station.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a first user equipment (UE) for initiating positioning reference signal exchange, the method comprising:
   identifying one or more UEs available for a positioning reference signal exchange with the first UE for sidelink-assisted positioning of the first UE, wherein identifying the one or more UEs available for the positioning reference signal exchange with the first UE for the sidelink-assisted positioning of the first UE comprises sending an availability request to each UE on a candidate list of UEs to request availability of each UE for the positioning reference signal exchange with the first UE over a sidelink channel; and
   providing to a network entity identifications of the one or more UEs available for the sidelink-assisted positioning of the first UE.

2. The method of claim 1, further comprising:
   determining a null-zone presence of the first UE being at least one of a current presence of the first UE in a null zone or a future presence of the first UE in the null zone; and
   wherein the one or more UEs are available for the sidelink-assisted positioning for the first UE during the null-zone presence of the first UE.

3. The method of claim 1, wherein identifying the one or more UEs available for the positioning reference signal exchange with the first UE for the sidelink-assisted positioning of the first UE is based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

4. The method of claim 1, further comprising:
   receiving from the network entity a request for identification of candidate UEs for the sidelink-assisted positioning for the first UE;
   wherein the identifications of the one or more UEs available for the sidelink-assisted positioning for the first UE are provided to the network entity in response to the request.

5. The method of claim 1, further comprising:
   receiving from the network entity the candidate list of UEs for the sidelink-assisted positioning for the first UE;
   wherein identifying the one or more UEs available for the positioning reference signal exchange with the first UE for the sidelink-assisted positioning of the first UE is at least partly based on the candidate list of the UEs;

wherein the identifications of the one or more UEs available for the sidelink-assisted positioning for the first UE are provided to the network entity in response to receiving the candidate list of UEs.

6. The method of claim 1, further comprising:
receiving a positioning reference signal configuration for at least one UE for the sidelink-assisted positioning for the first UE;
generating a positioning reference signal measurement for the at least one UE; and
determining a characteristic of the positioning reference signal measurement for the at least one UE is less than a threshold;
wherein the identifications of the one or more UEs available for the positioning reference signal exchange with the first UE for the sidelink-assisted positioning of the first UE are provided to the network entity in response to determining the characteristic of the positioning reference signal measurement for the at least one UE is less than the threshold.

7. The method of claim 1, further comprising:
receiving from a location server a positioning reference signal configuration for at least one UE in response to providing the identifications of the one or more UEs available for the sidelink-assisted positioning for the first UE;
generating a positioning reference signal measurement for the at least one UE; and
providing a location report to the location server based on the positioning reference signal measurement.

8. A first user equipment (UE) configured for initiating positioning reference signal exchange, comprising:
a transceiver;
a memory; and
a processor, communicatively coupled to the transceiver and the memory, and configured to:
identify one or more UEs available for a positioning reference signal exchange with the first UE for sidelink-assisted positioning of the first, wherein the processor is configured to identify the one or more UEs available for the positioning reference signal exchange with the first UE for the sidelink-assisted positioning of the first UE by being configured to send an availability request to each UE on a candidate list of UEs to request availability of each UE for the positioning reference signal exchange with the first UE over a sidelink channel; and
provide to a network entity, via the transceiver, identifications of the one or more UEs available for the sidelink-assisted positioning of the first UE.

9. The first UE of claim 8, wherein the processor is further configured to:
determine a null-zone presence of the first UE being at least one of a current presence of the first UE in a null zone or a future presence of the first UE in the null zone; and
wherein the one or more UEs are available for the sidelink-assisted positioning for the first UE during the null-zone presence of the first UE.

10. The first UE of claim 8, wherein the processor is configured to identify the one or more UEs available for the positioning reference signal exchange with the first UE for the sidelink-assisted positioning of the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

11. The first UE of claim 8, wherein the processor is further configured to:
receive from the network entity, via the transceiver, a request for identification of candidate UEs for the sidelink-assisted positioning for the first UE;
wherein the identifications of the one or more UEs available for the sidelink-assisted positioning for the first UE are provided to the network entity in response to the request.

12. The first UE of claim 8, wherein the processor is further configured to:
receive from the network entity, via the transceiver, the candidate list of UEs for the sidelink-assisted positioning for the first UE;
wherein the processor is configured to identify the one or more UEs available for the positioning reference signal exchange with the first UE for the sidelink-assisted positioning of the first UE at least partly based on the candidate list of the UEs;
wherein the identifications of the one or more UEs available for the sidelink-assisted positioning for the first UE are provided to the network entity in response to receiving the candidate list of UEs.

13. The first UE of claim 8, wherein the processor is further configured to:
receive, via the transceiver, a positioning reference signal configuration for at least one UE for the sidelink-assisted positioning for the first UE;
generate a positioning reference signal measurement for the at least one UE; and
determine a characteristic of the positioning reference signal measurement for the at least one UE is less than a threshold;
wherein the identifications of the one or more UEs available for the positioning reference signal exchange with the first UE for the sidelink-assisted positioning of the first UE are provided to the network entity in response to a determination that the characteristic of the positioning reference signal measurement for the at least one UE is less than the threshold.

14. The first UE of claim 8, wherein the processor is further configured to:
receive from a location server, via the transceiver, a positioning reference signal configuration for at least one UE in response to providing the identifications of the one or more UEs available for the sidelink-assisted positioning for the first UE;
generate a positioning reference signal measurement for the at least one UE; and
provide a location report to the location server based on the positioning reference signal measurement.

15. A method performed by a network entity for initiating positioning reference signal exchange for a first user equipment (UE), the method comprising:
sending to the first UE a candidate list of UEs for sidelink-assisted positioning of the first UE;
receiving from the first UE, in response to sending to the first UE the candidate list of UEs and at least partly based on the candidate list of the UEs, identifications of one or more UEs available for a positioning reference signal exchange with the first UE for the sidelink-assisted positioning of the first UE;
generating a positioning reference signal configuration for at least one UE in response to the identifications of the one or more UEs available for the positioning reference signal exchange with the first UE for the sidelink-assisted positioning of the first UE; and sending to the UE the positioning reference signal configuration for the at least one UE.

16. The method of claim 15, further comprising:

determining a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

17. The method of claim 15, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

18. The method of claim 15, further comprising:

sending to the first UE a request for identification of candidate UEs for the sidelink-assisted positioning for the first UE;

wherein the identifications of the one or more UEs available for the sidelink-assisted positioning for the first UE are received from the first UE in response to the request.

19. The method of claim 15, wherein the positioning reference signal configuration for the at least one UE sent to the first UE is a second positioning reference signal configuration for a second set of UEs, the method further comprising:

sending to the first UE a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold;

receiving from the first UE an indication that the characteristics of the positioning reference signal measurements for the first set of UEs are below the threshold with the identifications of the one or more UEs available for the positioning reference signal exchange with the first UE for the sidelink-assisted positioning of the first UE; and producing the second positioning reference signal configuration for the second set of UEs based on the first positioning reference signal configuration for the first set of UEs and the identifications of the one or more UEs available for the positioning reference signal exchange with the first UE for the sidelink-assisted positioning of the first UE.

20. The method of claim 15, further comprising:

receiving from the first UE a location report based on positioning reference signal measurements produced based on the positioning reference signal configuration for the at least one UE; and obtaining a location of the first UE based on the location report.

21. A network entity configured to initiate positioning reference signal exchange for a first user equipment (UE), comprising:

a transceiver;

a memory; and a processor, communicatively coupled to the transceiver and the memory, and configured to:

send to the first UE, via the transceiver, a candidate list of UEs for sidelink-assisted positioning of the first UE;

receive from the first UE, via the transceiver, in response to the processor being configured to send to the first UE the candidate list of UEs and at least partly based on the candidate list of the UEs, identifications of one or more UEs available for a positioning reference signal exchange with the first UE for the sidelink-assisted positioning of the first UE;

generate a positioning reference signal configuration for at least one UE in response to the identifications of the one or more UEs available for the positioning reference signal exchange with the first UE for the sidelink-assisted positioning of the first UE; and send to the UE, via the transceiver, the positioning reference signal configuration for the at least one UE.

22. The network entity of claim 21, wherein the processor is further configured to:

determine a null-zone presence of the first UE being at least one of a current presence of the first UE in a null zone or a future presence of the first UE in the null zone; and wherein the at least one UE is available for the sidelink-assisted positioning for the first UE during the null-zone presence of the first UE.

23. The network entity of claim 21, wherein the one or more UEs available for the positioning reference signal exchange with the first UE for the sidelink-assisted positioning of the first UE are identified by the first UE based on one or more of range estimation between the first UE and the one or more UEs, sidelink signal quality, Geometric Dilution of Precision, the first UE being located within a convex hull defined by at least the one or more UEs, diversity in angle of arrival, and diversity in angle of departure, or a combination thereof.

24. The network entity of claim 21, wherein the processor is further configured to:

send to the first UE, via the transceiver, a request for identification of candidate UEs for the sidelink-assisted positioning for the first UE;

wherein the identifications of the one or more UEs available for the sidelink-assisted positioning for the first UE are received from the first UE in response to the request.

25. The network entity of claim 21, wherein the positioning reference signal configuration for the at least one UE sent to the first UE is a second positioning reference signal configuration for a second set of UEs, wherein the processor is further configured to:

send to the first UE, via the transceiver, a first positioning reference signal configuration for a first set of UEs for the sidelink-assisted positioning for the first UE, wherein the first positioning reference signal configuration is sent before the second positioning reference signal configuration, wherein the first UE determines that characteristics of positioning reference signal measurements for the first set of UEs are below a threshold;

receive from the first UE, via the transceiver, an indication that the characteristics of the positioning reference signal measurements for the first set of UEs are below the threshold with the identifications of the one or more UEs available for the positioning reference signal exchange with the first UE for the sidelink-assisted positioning of the first UE; and produce the second positioning reference signal configuration for the second set of UEs based on the first positioning reference signal configuration for the first set of UEs and the identifications of the one or more UEs available for the positioning reference signal exchange with the first UE for the sidelink-assisted positioning of the first UE.

26. The network entity of claim 21, wherein the processor is further configured to:

receive from the first UE, via the transceiver, a location report based on positioning reference signal measurements produced based on the positioning reference signal configuration for the at least one UE; and obtain a location of the first UE based on the location report.

\* \* \* \* \*